United States Patent
Gastineau et al.

(10) Patent No.: US 7,496,531 B1
(45) Date of Patent: *Feb. 24, 2009

(54) METHODS, SYSTEMS, AND COMPUTER PROGRAM PRODUCTS FOR TRADING FINANCIAL INSTRUMENTS ON AN EXCHANGE

(75) Inventors: Gary L. Gastineau, Short Hills, NJ (US); Todd J. Broms, New York, NY (US); Daniel J. McCabe, Upper Saddle River, NJ (US); Paul E. Kuhnle, Doylestown, PA (US)

(73) Assignee: Managed ETFs LLC, Summit, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/714,923

(22) Filed: Mar. 7, 2007

Related U.S. Application Data

(63) Continuation-in-part of application No. 11/141,243, filed on May 31, 2005.

(60) Provisional application No. 60/779,904, filed on Mar. 7, 2006.

(51) Int. Cl.
G06Q 40/00 (2006.01)

(52) U.S. Cl. .......................................... 705/35; 705/37

(58) Field of Classification Search .................. 705/35, 705/37, 39; 708/105, 110, 134; 434/107, 434/109, 188
See application file for complete search history.

(56) References Cited

U.S. PATENT DOCUMENTS

| | | | |
|---|---|---|---|
| 5,806,048 A | * | 9/1998 | Kiron et al. .............. 705/36 R |
| 5,845,266 A | | 12/1998 | Lupien et al. |
| 5,983,204 A | | 11/1999 | Debe |
| 6,012,046 A | | 1/2000 | Lupien et al. |
| 6,029,146 A | * | 2/2000 | Hawkins et al. ............... 705/35 |
| 6,098,051 A | | 8/2000 | Lupien et al. |
| 6,236,972 B1 | | 5/2001 | Shkedy |
| 6,418,419 B1 | | 7/2002 | Nieboer et al. |
| 6,564,192 B1 | | 5/2003 | Kinney, Jr. et al. |

(Continued)

OTHER PUBLICATIONS

Sydney LeBlanc's article Did You Know Them, published On Wall Street, Oct. 1, 2004, p. 1.*

(Continued)

*Primary Examiner*—Mary Cheung
*Assistant Examiner*—Brian Fertig
(74) *Attorney, Agent, or Firm*—Sterne, Kessler, Goldstein & Fox PLLC

(57) ABSTRACT

Systems, methods and computer program products for trading financial instruments are described herein. A first order to buy or sell a financial instrument is received, where the first order includes at least one contingency. The contingency may be price-based and/or volume-based. For example, the contingency can be based on a volume-weighted average price of the security (VWAP); a time-weighed average price of the security (TWAP); a target trading volume of the security as a percentage of total market volume during a specified period (TVOL); or a net asset value (NAV) of the security. The first order is matched with a corresponding second order. For example, a bid for a given security is matched with an offer for the same security. This matching operation also includes ensuring that the contingency(ies) of the first order are compatible with the contingency(ies) of the second order. Thereafter, the contingencies are calculated, and then the first and second orders are executed pursuant to the calculated contingencies.

79 Claims, 17 Drawing Sheets

U.S. PATENT DOCUMENTS

| | | |
|---|---|---|
| 6,879,964 B2 | 4/2005 | Sauter et al. |
| 6,941,280 B1 | 9/2005 | Gastineau et al. |
| 7,024,387 B1 | 4/2006 | Nieboer et al. |
| 7,047,218 B1 | 5/2006 | Wallman |
| 7,099,838 B1 | 8/2006 | Gastineau et al. |
| 7,444,300 B1 | 10/2008 | Broms et al. |
| 2001/0025266 A1 | 9/2001 | Gastineau et al. |
| 2002/0194107 A1 | 12/2002 | Li et al. |
| 2003/0177077 A1 | 9/2003 | Norman |
| 2003/0177086 A1 | 9/2003 | Gomber et al. |
| 2003/0177126 A1 | 9/2003 | Weingard et al. |
| 2003/0233302 A1 | 12/2003 | Weber et al. |
| 2004/0044609 A1 | 3/2004 | Moore |
| 2004/0186803 A1 | 9/2004 | Weber et al. |
| 2004/0236636 A1 | 11/2004 | Lutnick et al. |
| 2004/0243502 A1 | 12/2004 | Slowik et al. |
| 2005/0149426 A1 | 7/2005 | Jokisch et al. |
| 2006/0026091 A1 | 2/2006 | Keen et al. |
| 2006/0059078 A1 | 3/2006 | Courbois et al. |
| 2006/0167786 A1 | 7/2006 | Gambir et al. |
| 2007/0027790 A1 | 2/2007 | Gastineau et al. |

OTHER PUBLICATIONS

Berk, Jonathan B. and Richard C. Green, "Mutual Fund Flows and Performance in Rational Markets," Journal of Political Economy, vol. 112, No. 6, Dec. 2004, 1269-1295 (available at http://www.journals.uchicaqo.edu/JPE/journal/contents/v112n6.html). An earlier version (Dec. 2002) was published as an NBER working paper (available at http://papers.ssrn.com/sol3/papers.cfm?abstract_id=338881).

Beinstein, Peter, "What's It All About, Alpha?," Institutional Investor, May 2004, 48-52.

Chen, Joseph, Harrison Hong, Ming Huang and Jeffrey Kubik, "Does Fund Size Erode Performance? Liquidity, Organizational Diseconomies and Active Money Management," Working Paper, Sep. 2002 and May 2004 (available at http://www.rcf.usc.edu/~josephsc/files/fundsize.pdf).

Clark, Andrew, "Four Benchmark-Beating Funds, Does Fund Size Affect Performance?", Lipper Research Study, Jan. 5, 2004 (available at http://www.research.lipper.wallst.com/researchStudiesOverview.asp).

Edelen, Roger M., Investor Flows and the Assessed Performance of Open-End Mutual Funds, Journal of Financial Economics 53,1999, 439-466.

Gastineau, Gary L., *The Exchange-Traded Funds Manual*, 2002b, John Wiley & Sons.

Gastineau, Gary L., "Protecting Fund Shareholders From Costly Share Trading," Financial Analysts Journal, May/Jun. 2004a, 22-32 (available at http://www.etfconsultants.com/Protecting%20Funds%20Shareholders%20FAJ.pdf).

Gastineau, Gary L. and Craig J. Lazzara, "Reinventing the Investment Fund" from *The Investment Think Tank: Theory, Strategy, and Practice for Advisers*. Harold Evensky and Deena Katz, editors, Bloomberg Press, 2004, 153-178. Also appeared in Bloomberg Wealth Manager under the title of "Extreme Makeover," Nov. 2004, 57-68.

Greene, Jason T., and Charles W. Hodges, "The Dilution Impact of Daily Fund Flows on Open-End Mutual Funds," *Journal of Financial Economics*, vol. 65, No. 1, Jul. 2002, 131-158.

Johnson, Woodrow T., "Predictable Investment Horizons and Wealth Transfers among Mutual Fund Shareholders," Journal of Finance, Oct. 2004, 1979-2012.

Porter, Michael, "The Future Is Now: The AMEX's Solution To The Active ETF Riddle," Lipper Fund Industry Insight Reports, Dec. 6, 2004, (available at http://www.research.lipper.wallst.com/fundIndustryOverview.asp; $15 payment required to view article).

Porter, Michael, "Gary Gastineau on Why Actively-Managed Exchange-Traded Funds Can Be The Greatest Thing Since Money Market Funds," Lipper Fund Industry Insight Reports, Nov. 30, 2004, (available at http://www.research.lipper.wallst.com/fundIndustryOverview.asp, $15 payment required to view article).

Securities and Exchange Commission, Concept Release Actively-Managed Exchange-Traded Funds, 17 CFR Part 270, Release No. IC-25258; File No. S7-20-011 (availabe at http://www.sec.gov/rules/concept/ic-25258.htm).

Securities and Exchange Commission, Comments on Concept Release Actively-Managed Exchange-Traded Funds, 17 CFR Part 270, Release No. IC-25258; File No. S7-20-011 (available at http://www.sec.gov/rules/concept/s72001.shtml).

Comments of Paul Charbonnet, Investors FastTrack, Baton Rouge, La., Dec. 12, 2002 (available at http://www.sec.gov/rules/concept/s72001/pcharbonnet1.txt).

Comments of Pascal Redding, Jun. 6, 2002 (available at http://www.sec.gov/rules/concept/s72001/predding1.txt).

Comments of John White, May 4, 2002, (available at http://www.sec.gov/rules/concept/s72001/white1.txt).

Comments of R. Sheldon Johnson, Managing Director, Morgan Stanley & Co. Incorporated, May 3, 2002 (available at http://www.sec.gov/rules/concept/s72001.johnson1.htm).

Comments of Charles M. Bartlett Jr., May 2, 2002 (available at http://www.sec.gov/rules/concept/s72001/bartlett.txt).

Comments of Michael J. Ryan, Jr., Executive Vice President and General Counsel, The American Stock Exchange, LLC, Mar. 5, 2002 (available at http://www.sec.gov/rules/concept/s72001/ryan1.htm).

Comments of Stanley Keller, Chair, Committee on Federal Regulation of Securities; Diane E. Ambler, Chair, and Jay G. Baris, Vice-Chair, Subcommittee on Investment Companies and Investment Advisers, Section of Business Law of the American Bar Association, Feb. 1, 2002 (available at http://www.sec.gov/rules/concept/s72001/keller1.htm).

Comments of Robert M. Steele, Executive Vice President, Rydex Global Advisors Inc., Jan. 31, 2002 (available at http://www.sec.gov/rules/concept/s72001/steele1.htm).

Comments of Mike Schoren, Jan. 20, 2002 (available at http://www.sec.gov/rules/concept/s72001/schoren1.txt).

Comments of Gary L. Gastineau, Managing Director, Nuveen Investments, Jan. 14, 2002 (available at http://www.sec.gov/rules/concept/s72001/gastineau1.htm).

Comments of Joel Greenberg, Managing Director, Susquehanna International Group, Jan. 14, 2002 (available at http://www.sec.gov/rules/concept/s72001/greenberg1.htm).

Comments of Austin J. Fleites, Principal, State Street Bank and Trust Company, Jan. 14, 2002 (available at http://www.sec.gov/rules/concept/s72001/fleites1.htm).

Comments of Richard F. Morris, Senior Counsel, Barclays Global Investors, Jan. 11, 2002 (available at http://www.sec.gov/rules/concept/s72001/morris1.htm).

Comments of Ivar Bjornstad, President, Shoreland Partners LLC, Jan. 11, 2002 (available at http://www.sec.gov/rules/concept/s72001/bjornstad1.htm).

Comments of Kriya Inc., Jan. 8, 2002 (available at http://www.sec.gov/rules/concepts72001/goff1.htm).

Comments of Stacy W. Goff, Vice President and Assistant General Counsel, CenturyTel, Inc., Jan. 7, 2002 (available at http://www.sec.qov/rules/concept/s72001/goff.htm).

Stein, Jeremy C., Why Are Most Funds Open-End? Competition and the Limits of Arbitrage, Working Paper, Jan. 2004, Harvard University (available at http://post.economics.harvard.edu/faculty/stein/papers/OpenEndJanO4revision.pdf).

Barney, Lee, "Actively Managed ETFs: Coming Soon to an Exchange Near You?", The Street, May 24, 2001, 4 pgs. (http://www.thestreet.com/funds/funds/1440520.html).

"Trading Strategies" Turbo Trade, http://www.turbotrade.com/content/view/116/94.

Gould, Carole, "Mutual Funds; The Risky Business of Selling short", The New York Times, May 17, 1992, 2 pgs.

Gastineau, Gary L., "Reinventing the Mutual Fund: An Essential Piece of Financial Engineering", ETF Consultants, Feb. 25, 2005, 32 pgs.

Sydney LeBlanc's article Did You Know Them?, published On Wall Street, Oct. 1, 2004, p. 1.

* cited by examiner

- Symbol — 1502
- Extension — 1504
- Instructions — 1506
- Transaction Size — 1508
- Price — 1510
- Limit Price — 1512
- SUBMIT — 1514

- Symbol — SPY — 1502
- Extension — VW — 1504
- Instructions — BUY — 1506
- Transaction Size — 1000 — 1508
- Price — 100.05 — 1510
- Limit Price — $131.00 — 1512
- SUBMIT — 1514

METHODS, SYSTEMS, AND COMPUTER PROGRAM PRODUCTS FOR TRADING FINANCIAL INSTRUMENTS ON AN EXCHANGE

CROSS REFERENCE TO RELATED APPLICATIONS

The present application claims priority to U.S. Provisional Patent Application No. 60/779,904, filed Mar. 7, 2006, and is a continuation-in-part of pending U.S. patent application Ser. No. 11/141,243, filed May 31, 2005, both of which are incorporated herein by reference in their entireties.

BACKGROUND OF THE INVENTION

1. Field of Invention

The invention relates generally to financial services, and in particular, to the trading of financial instruments on an exchange or an electronic communication network (ECN).

2. Background Art

In 1993, The American Stock Exchange ("AMEX") created the first exchange-traded fund (ETF) in the United States, SPDR ("SPY"), Standard & Poor's Depositary Receipts which represent ownership in the SPDR Trust Series 1, a unit investment trust holding the stocks in the Standard & Poor's 500 Composite Stock Price Index. Two other well known examples of ETFs also structured as unit investment trusts are: (i) Diamonds ("DIA"), Diamonds Trust Series 1 holding the equity securities included in the Dow Jones Industrial Average, and (ii) the Nasdaq 100 Index Tracking Stock ("QQQQ") which represents ownership in the Nasdaq 100 Trust holding the equity securities included in the Nasdaq 100 Index. Most other ETFs are organized as management investment companies with a structure and governance mechanism patterned after traditional mutual funds. All ETFs currently traded in the United States are designed and intended to provide investment results that, before expenses, generally correspond to the price and dividend yield performance of their respective index.

ETFs were originally established for investors to trade and hold diversified portfolios of marketable securities (stocks and/or fixed income securities) generally structured to correspond to a specific market index covering broad or narrow segments of a stock or bond market. Approximately 150 indexed ETFs were traded in the United States at the end of 2004.

Unlike open-end mutual funds and like all publicly traded stocks, ETF shares are structured to trade intra-day with the ease and liquidity of a share of stock, giving investors ownership of a portfolio through one security and the ability to purchase fund shares on margin and to sell them short. Currently available ETFs are generally low-cost funds because they are based on an index, and are not charged active management fees. The Securities and Exchange Commission ("SEC") has not yet allowed ETFs to be "actively managed," but has issued a Concept Release (SEC Release No. 1C-25258, Nov. 8, 2001, Actively-Managed Exchange-Traded Funds) and otherwise indicated a willingness to consider applications to issue such funds.

Pursuant to SEC exemptive orders, the currently available ETFs do not sell individual fund shares directly to investors as mutual funds do. In the generalized ETF creation and redemption process as described herein, ETFs issue and redeem their shares only in blocks (50,000 fund shares in the case of the SPY, for example) that are known as "Creation Units." The creation and redemption of ETF shares is done primarily by authorized participants (broker-dealers that have executed agreements with a fund's agents to create and redeem fund shares). Although a few funds authorize all cash creations and/or redemptions, authorized participants generally do not purchase or redeem Creation Units entirely for cash, but rather buy or sell Creation Units by delivering or receiving a basket of securities (plus or minus cash) that generally mirrors the portfolio of the ETF in a transaction facilitated by the fund's custodian and/or transfer agent. The authorized participants who purchase and redeem ETF Creation Units are predominantly market makers in the fund shares. After purchasing a Creation Unit, the authorized participant often splits it up and sells the individual shares on the secondary market, permitting other investors to trade in lots as small as an individual share.

Investors who want to sell their ETF shares have two options: (1) they can sell individual shares to other investors on the secondary market, or (2) they can sell Creation Units back to the ETF. ETFs generally redeem Creation Units in-kind by giving investors securities from the fund portfolio instead of cash. For example, the DIA ETF invested in the stocks in the Dow Jones Industrial Average (DJIA) would pay a redeeming shareholder by delivering some or all of the securities that constitute the DJIA. At its discretion, the fund may substitute cash for some or all of the securities in a creation or redemption transaction. To prevent investor confusion and because the redeemability of ETF shares is limited to Creation Units, ETFs may not call themselves mutual funds.

Mutual funds and ETFs are regulated primarily under the Investment Company Act of 1940, but are also subject to significant regulation under the Securities Act of 1933 and the Securities Exchange Act of 1934.

Unlike the ETFs available today, mutual funds are frequently actively managed.

Like ETFs, mutual funds pool capital from many investors and invest in stocks, bonds, short-term money-market instruments, and other securities. Traditional and distinguishing characteristics of mutual funds are: (i) mutual fund shares are purchased by investors for cash, directly or through a broker or other intermediary from the fund itself, rather than from other investors or market makers on a secondary market; (ii) the purchase price that investors pay for mutual fund shares is often the fund's per share net asset value (NAV); (iii) shareholder fees that the fund imposes at purchase (such as sales loads) may or may not be charged; (iv) mutual fund shares are usually redeemed at NAV for cash by the fund at the time of sale by the investor rather than being sold through and into the secondary market; (v) mutual funds generally sell and redeem their shares daily without limit, although some funds will stop selling new shares when they become large; and (vi) mutual fund operations and portfolios typically are managed by management companies known as investment advisers that are registered with the SEC.

Investment advisers receive management fees for managing the portfolio and operating the mutual fund. Some funds may also have sales charges or loads imposed in connection with a fund share sale or redemption or charges for distribution and service costs, commonly levied as 12b-1 fees, may be collected annually by the fund manager. Additionally, a mutual fund may offer different classes of shares with each class having different fees and expenses.

Early in September 2003, New York State's attorney general, Eliot Spitzer, announced a $40 million settlement with a hedge fund that had allegedly engaged in "late trading" and "market timing" with mutual funds. Late trading allegedly involved the hedge fund being permitted to buy and sell fund shares at the fund's 4:00 p.m. net asset value (NAV) several hours after the prices used in the NAV calculation were determined—a violation of U.S. SEC Rule 22c-1. Distinct from the transactions at "backward" prices were a number of market-timing trades initiated at or slightly before 4:00 p.m. In some cases, these trades may have taken advantage of "stale" prices in foreign or illiquid markets. In many cases, the market-timing trades created a need for the fund to trade during the following day's trading session. Any market impact cost of the next-day trades was borne by all the fund's shareholders.

There is strong evidence, apart from the recent publicity, that fund share orders coming to a fund late in the day is a common practice. These orders come from investors with motives far more diverse than market timing over a few days.

Since the Spitzer settlement called attention to these practices, the emphasis of most regulators and pundits has been on developing regulations to prevent improper trades based on stale prices or executed in violation of prospectus prohibitions against market timing. The problem with adding new regulations is that the abuses cited are possible only because the standard mutual fund pricing and trading processes are inherently flawed.

Most fund share trades that arrive late in the day are costly to existing fund shareholders no matter whether they were initiated by short-term traders or by ordinary investors. The cost to shareholders of fund orders entered at or just before the market close has been estimated as high as $40 billion a year. Orders the fund does not receive by early afternoon cost fund shareholders much more than simply the profits that some traders take away.

Last-minute fund buy orders frequently arrive on days when the market is strong near the close. Because orders to be executed at the market-on-close must be entered earlier, investors cannot buy the separate stock positions held by a typical equity fund at 4:00 p.m. closing prices by entering stock buy orders at 3:59 p.m. The investor can, however, buy shares in most funds a few seconds before 4:00 p.m. Just as an investor cannot execute stock trades at closing prices right before the NAV calculation, the fund cannot make an immediate trade for its portfolio at closing prices to invest the new cash. Whether they intend to get in and out quickly or to stay for years, many buyers of fund shares make last-minute purchases on days with a strong market at the close. If these buyers capture market momentum, their trades are particularly costly to their fellow fund shareholders because the fund will have to buy stocks at even higher prices on the next trading day to invest the cash inflow. Correspondingly, if a shareholder redeems fund shares with an order entered near 4:00 p.m., the fund will have to sell portfolio securities the next trading day, often at lower prices, to cover the redemption. The fund is thus providing free liquidity to these investors, and the fund's shareholders pay the cost of that liquidity. The cost of providing this liquidity is a permanent drag on the performance of the fund. It does not go away, even if the investor stays in the fund for many years. The net effect of the limited regulatory changes proposed in the wake of the scandals is to slightly reduce the nominal level of shareholder protection from the cost of late afternoon orders, offering false comfort to investors.

Studies of the impact of fund share trading offer compelling evidence that the costs to ongoing (non-trading) shareholders of providing free liquidity to trading shareholders are substantial. Roger M. Edelen (1999), then a professor at the Wharton School at the University of Pennsylvania, quantified the adverse effect of shareholder entry and exit costs on fund performance. Using a sample of 166 conventional (no-load) mutual funds ranging in type from small-capitalization to income funds, Edelen examined all purchases and sales of securities by the funds over a series of six-month periods. The six-month interval was determined by the reporting interval for mutual funds at the time of the study. Edelen broke down each fund's trading into flow (fund share turnover) and non-flow (portfolio composition changes) components. He measured how much of the flow-related trading was incremental trading resulting from the need to purchase and sell portfolio securities in response to the entry and exit of shareholders. His methodology revealed the cost of this trading, not the motives of the buying and selling shareholders. Edelen did not attribute a performance cost to flow trading if the manager was able to use the flow to make desired portfolio changes. He concluded that for the average fund in his sample, 30 percent of the flow into and out of the fund did not result in incremental trading and about half of the fund's total trading was flow related.

If 70 percent of flow resulted in incremental trading, then about 35 percent of total fund trading was incremental trading that resulted from providing liquidity to entering and leaving shareholders. The average fund Edelen studied was clearly not used aggressively by fund traders; aggressive trade timing can easily cause a rate of annual fund share turnover of several hundred percent. The modest flow and fund share turnover in Edelen's sample notwithstanding, the trading costs he attributed to the liquidity offered to entering and exiting shareholders accounted for an average net reduction in annual investor return of about 1.43 percent.

The 1.43 percent cost of providing liquidity to buyers and sellers of fund shares easily justifies a $40 billion annual minimum estimated performance cost of late-afternoon fund share orders. Recent figures show assets in U.S. stock and hybrid funds at about $4 trillion. Applying a conservative cost of providing liquidity of just 1 percent annually produces a $40 billion estimate of the cost/performance penalty that this feature of mutual funds costs the funds' shareholders.

Another problem with existing funds is the fact that most sizeable investment-management organizations offer a wide variety of products to investors. These investment products are theoretically managed independently because each portfolio is independent in composition. However, funds and other products with the same advisor are often managed under a common investment process and hold numerous securities in common. Furthermore, the investment manager has a responsibility to the beneficial holders of each portfolio or "separately managed" product to treat them fairly, when management of the products is partly integrated. Thus, when the firm embarks upon the purchase of a particular security or group of securities, the securities are often purchased for many or maybe even all of the manager's accounts or funds at about the same time. To manage conflicts of interest, many investment management organizations have developed techniques to handle purchases and sales for different accounts in a random sequence or rotation. The rotation is designed to assure that a particular account or group of accounts comes first on the list for some investment changes, in the middle for others and, inevitably, at the bottom of the list for still others. If the investment management organization has a trading desk that handles trades for all of the manager's accounts, the desk may calculate an average price and give each account the same average price with all accounts participating in trades over a longer period. The problem with these procedures is that each type of account that might hold a specific position has characteristics that cause its trading practices to reveal different amounts and kinds of information, almost at random, to other market participants while the trading moves through account categories or trades are allocated to all accounts over a period of a few weeks. An investment manager that manages only funds registered under the Investment Company Act of 1940 can preserve the value of investment information better than a manager that has a diverse product line.

Mediocre performance by most mutual funds has been attributed in part to a fund management incentive structure that encourages funds to accept all assets offered to them by potential shareholders. A management process capable of delivering superior performance for a small fund is often swamped with assets after a brief period of good performance. The manager makes more with a larger asset base, but shareholder performance is diluted by asset growth. Both shareholders and fund managers might benefit from a fund structure that caps asset growth and pays higher fees for managers that deliver superior results.

Although mutual funds are used by many investors including individuals, institutions, endowment funds, qualified retirement plans and others, mutual funds and their typical investment process are not generally designed to: (i) offer investors inherent protection from most of the abuses uncovered in the recent mutual fund trading scandals; (ii) minimize investor costs from fund share and portfolio turnover; (iii) require an efficient investment management process at the management company responsible for the selection of investments for a fund; (iv) provide an appropriate allocation of transaction costs between entering and leaving shareholders on the one hand and ongoing shareholders on the other hand; (v) allocate marketing and service costs appropriately among various groups or classes of fund shareholders; or (vi) protect the confidentiality of an investment manager's trading plans when the fund or funds are managed as part of a multi-product integrated investment process.

Trading in futures contracts, i.e., contracts for future delivery of a commodity or a financial instrument at a price determined at the time of the transaction, has been common in financial markets for many years. Transaction mechanisms for trading securities, commodities and other financial instruments at a value to be determined in the future have been used far less frequently than traditional futures contracts.

Contracts for settlement at a price to be determined in the future are generally traded over-the-counter and on non-standardized terms. Commitments to trade at a price to be determined are usually made orally and orders to trade at a price to be determined often state an intended fraction of total volume to be bought or sold that may not be binding on the parties. These orders have not been handled as a distinct order type, and the pricing and settlement of trades resulting from the orders has not been subject to locked-in contracts such as those executed on an exchange. Contracts for settlement at a price to be determined in the future are generally traded over-the-counter and on non-standardized terms. Commitments to trade at a price to be determined are usually made informally, and orders to trade at a price to be determined often state a number of trading units or an intended fraction of total volume to be bought or sold that may not be binding on the parties. These orders have not been handled as distinct order types and the pricing and settlement of trades resulting from the orders has not been subject to locked-in contracts such as those executed on an exchange or on electronic communication networks (ECNs) that feature binding trade commitments. Any binding contracts are generally made in direct negotiations between a customer and a broker-dealer who know each other's identity, in contrast to anonymous trading available through exchanges and ECNs.

While mutual funds have long sold and redeemed their shares at the net asset value (NAV) next calculated by the fund, mutual funds, exchange-traded funds (ETFs), and other shares for which a net asset value is periodically calculated have not been traded on exchange markets for settlement at or relative to a net asset value to be determined at a future time after the exchange transaction. The familiarity of investors with the net asset value-based sales and redemptions model used by mutual funds suggests a need for such a trading mechanism for exchange-traded funds and for other instruments for which the net asset value is periodically calculated. The trading practices of employer-sponsored retirement savings plans suggest a net asset value-based trading process for exchange-traded funds will meet the needs of these plans better than current exchange trading practices for such funds.

The increasing sophistication and complexity of financial markets and of the trading techniques used by participants in these markets indicates a need for a variety of types of trading around and relative to prices to be determined in the future and/or in quantities stated relative to the total trading volume in a market over some interval. The need for this trading stems from efforts by large investors, such as institutional investors, to reduce trading costs, including the cost of the market impact associated with trading. For price and volume-contingent trading, as well as for other types of financial trading, there is a need to maintain confidentiality as to trading plans and anonymity as to the identity of traders. Confidentiality and anonymity can be accomplished most effectively with exchange systems.

Interest in trading procedures like volume-weighted average price (VWAP) executions has created a need for exchange markets to trade commodities, securities and other financial instruments at or relative to a price to be determined at some point in the future and in volumes stated as a percentage of the total volume of trading in a market over a specified period. For both institutional and retail investors, net asset value-based trading in exchange-traded funds permits fund investors accustomed to the net asset value trading practices of mutual funds to trade exchange-traded fund shares at or relative to a net asset value to be determined in the future and to take advantage of a trade timing option they have not been able to obtain value for in the past. Net asset value-based trading can make it easier for small accounts in employer-sponsored defined benefit plans to trade exchange-traded funds at low cost.

There is, therefore, a need for systems, methods, and computer program products that permit standardized trading in contracts for delivery and settlement of securities, commodities and other financial instruments at contingent prices and/or in contingent volumes, such contingent prices and/or volumes to be determined after the execution of the exchange transaction. There is a further need to improve price discovery and standardize order entry and settlement formats in the market for these contingently priced and/or sized transactions. There is a need for an exchange environment to preserve the anonymity of trading parties, to accommodate algorithmic trading, to improve the execution of block trades and to provide access to contingently priced and/or sized markets for a wide range of investors on equal terms.

SUMMARY OF THE INVENTION

Briefly stated, the invention is directed to systems, methods and computer program products for trading financial instruments. According to an embodiment, an order to buy or sell a financial instrument is received. The order includes at least one contingency. In an embodiment, the contingency is price-based and/or volume-based. For example, the contingency can be based on a net asset value (NAV) of the financial instrument, if a net asset value for the financial instrument is periodically calculated.

The order is matched with a corresponding order. For example, a bid for a given financial instrument is matched with an offer for the same financial instrument. This matching operation also includes ensuring that the contingencies of the orders are compatible. Thereafter, the contingencies are calculated, and the matched orders are settled on terms set by the calculated contingencies.

It is to be understood that both the foregoing general description and the following detailed description are not limiting, but are intended to provide further explanation of the invention claimed. The accompanying drawings which are incorporated in and constitute part of the specification are included to illustrate and provide a further understanding of the method and system of the invention. Together with the description, the drawings serve to explain the principles of the invention.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

FEATURES OF THE INVENTION

The present invention, as described herein in its various embodiments, may be characterized by the following features and advantages. Embodiments of the invention may include any combination of features recited below, as well as others described herein.

1. A trading system and process implemented by means of computers and networks operated at one or more locations by or for an exchange, an electronic communications network or customers of an exchange and/or electronic communications network, such computers and networks used individually or in combinations wherein a financial instrument is traded on an exchange and/or an electronic communications network that facilitates transactions for settlement at or relative to a price or volume or price and volume to be determined in a specified manner after the time of the transaction.

2. A trading system and process implemented by means of computers and networks operating at one or more locations used individually or in combinations wherein a financial instrument is traded in a first-stage transaction for settlement at or relative to a price or volume or price and volume to be determined in a specified manner after the time of the first-stage transaction;

wherein the first-stage order to trade a financial instrument is entered in a format designed to accomplish execution of the transaction subject to future determination of a contingent price or volume or both price and volume that completes the terms of the trade; and determination of the terms of the trade occurs in at least two stages, the first stage setting some of the terms with contingent price or volume terms subject to later determination in the second stage.

3. The trading system and process of Feature 2 wherein exchange rules designate trading lot size.

4. The trading system and process of Feature 2 wherein exchange or an electronic communications network designates trading tick size.

5. The trading system and process of Feature 2 wherein the exchange, an electronic communications network that facilitates transactions or an independent service provider calculates or collects and publishes, transmits or facilitates dissemination of price or volume data used to set price or volume-contingent terms of the trade.

6. The trading system and process of Feature 5 wherein data calculation and collection is subject to exchange or other regulatory oversight.

7. The trading system and process of Feature 5 wherein disseminated data is accessed by one or more receiving parties such as a market data service provider, a trade processing organization or a financial intermediary.

8. The trading system and process of Feature 2 wherein the first-stage order entry interface accepts a root trading symbol for the financial instrument with an extension to designate the nature of a price or volume contingent trade.

9. The trading system and process of Feature 8 wherein the order entry interface is accessed by a financial intermediary or a trading party.

10. The trading system and process of Feature 2 wherein the first-stage order entry interface accepts a specified trading symbol to designate both the financial instrument and the nature of a price or volume contingent trade.

11. The trading system and process of Feature 10 wherein the order entry interface is accessed by a financial intermediary or a trading party.

12. The trading system and process of Feature 2 wherein an arbitrary proxy for a settlement-determining price serves as the anchor point for any bids, offers and executions of trades to be translated into currency terms after any contingent price or volume is set.

13. The trading system and process of Feature 12 wherein the arbitrary proxy anchor point is set at a specific number, such as 100, and a trade made at a price above the anchor point or below the anchor point is used to determine a price at a similar difference above or below the settlement-determining price with the difference measured in currency.

14. The trading system and process of Feature 12 wherein an arbitrary proxy anchor point is set at a specified number and a trade made at a price above the proxy anchor point or below the proxy anchor point is used to determine a percentage difference above or below the settlement-determining price with the difference measured in currency to a precision determined by the rules of the market.

15. The trading system and process of Feature 2 wherein the standard unit of first stage trading in a volume-contingent trade is a percentage of trading volume in the financial instrument during a specified time period.

16. The trading system and process of Feature 2 wherein the terms of the transaction determined in the first-stage are reported and transmitted only to the transacting parties.

17. The trading system and process of Features 2 and 16 wherein the terms of the transaction determined in the first-stage are accessed by the transacting parties.

18. The trading system and process of Feature 17 wherein the transacting counterparties compare and confirm the terms of the transaction determined in the first-stage trade report.

19. The trading system and process of Feature 2 wherein terms of the transaction determined in the first-stage are transmitted to the exchange's market data reporting system.

20. The trading system and process of Feature 19 wherein transaction volume is disclosed by the exchange's market data reporting system.

21. The trading system and process of Feature 19 wherein the settlement price relationship to the contingent price is transmitted to the exchange's market data reporting system.

22. The trading system and process of Feature 19, 20, or 21 wherein terms of the transaction determined in the first stage are obtained by an entity with access to market data reports such as a market data service provider, a trade processing organization or a financial intermediary.

23. The trading system and process of Feature 2 wherein the anonymity of trading parties is protected by their brokers.

24. The trading system and process of Feature 2 wherein the anonymity of trading parties is protected by an exchange's or an electronic communications network's rules or systems.

25. The trading system and process of Feature 2 wherein an algorithmic trading engine is accommodated by means of computer systems to facilitate an automated trade contingent on price or volume or price and volume to be determined after the time of the first-stage transaction.

26. The trading system and process of Feature 2 wherein information on the execution subject to a contingent price or to contingent volume or calculations of contingent price or volume terms are delivered by an exchange or an electronic communications network or a service provider to a market data vendor, an industry service organization, a market participant or financial media.

27. The trading system and process of Feature 26 wherein information on price-contingent or volume-contingent trades is accessed by a market data vendor, an industry service organization, a market participant or financial media.

28. The trading system and process of Feature 2 wherein the trade is a volume-weighted average price trade.

29. The trading system and process of Feature 2 wherein the trade is a time-weighted average price trade.

30. The trading system and process of Feature 2 wherein the trade is a target volume trade.

31. The trading system and process of Feature 2 wherein the trade is a net asset value-based trade.

32. The trading system and process of Feature 31 wherein the net asset value is calculated at a time or in a way different from the procedure used for an end-of-day net asset value calculation.

33. The trading system and process of Feature 31 wherein the net asset value is calculated from the session opening transaction in each position in a fund portfolio.

34. The trading system and process of Feature 2 wherein the order entry format is modified to minimize systems changes needed to accommodate price-contingent or volume-contingent trades.

35. The trading system and process of Feature 2 in which single session time in force orders are accommodated.

36. The trading system and process of Feature 2 in which multiple session time in force orders are accommodated.

37. The trading system and process of Feature 2 wherein some terms of a transaction may be customized by parties to the trade to meet the requirements of one or both parties.

38. The trading system and process of Feature 2 wherein the terms of a trade are modified retroactively when an error in a contingent price or contingent volume calculation is corrected.

39. A method of trading financial instruments, comprising:
receiving a first order to buy or sell a financial instrument, wherein said first order includes a price or value contingency;
matching said first order with a corresponding second order, said second order comprising a compatible price or value contingency;
calculating a contingency; and
executing and settling matched orders on terms set by the calculated contingency.

40. The method of Feature 39, wherein said contingency of said first order is based on a net asset value (NAV) of the financial instrument.

41. The method of Feature 39, wherein said contingency of said first order is stated relative to a proxy value.

42. A method of submitting an order to purchase or sell a financial instrument, comprising:
providing order information, wherein said order information comprises (a) information identifying said financial instrument, and (b) information identifying one or more contingencies, each of said contingencies being price-based; and
providing a bid or offer price relative to a proxy value.

43. The method of Feature 42, wherein said providing order information step comprises:
providing a root symbol identifying said financial instrument; and
applying an extension to said root symbol, wherein said extension identifies at least one contingency placed on transactions involving said financial instrument.

BRIEF DESCRIPTION OF THE
DRAWINGS/FIGURES

FIGS. 15A and 15B illustrate an exemplary computer interface through which an order for a financial instrument may be entered onto an exchange or an ECN in accordance with an embodiment of the present invention.

The features and advantages of the present invention will become more apparent from the detailed description set forth below when taken in conjunction with the drawings. In the drawings, like reference numbers generally indicate identical, functionally similar, and/or structurally similar elements.

DESCRIPTION OF PREFERRED EMBODIMENTS

Figure 1:
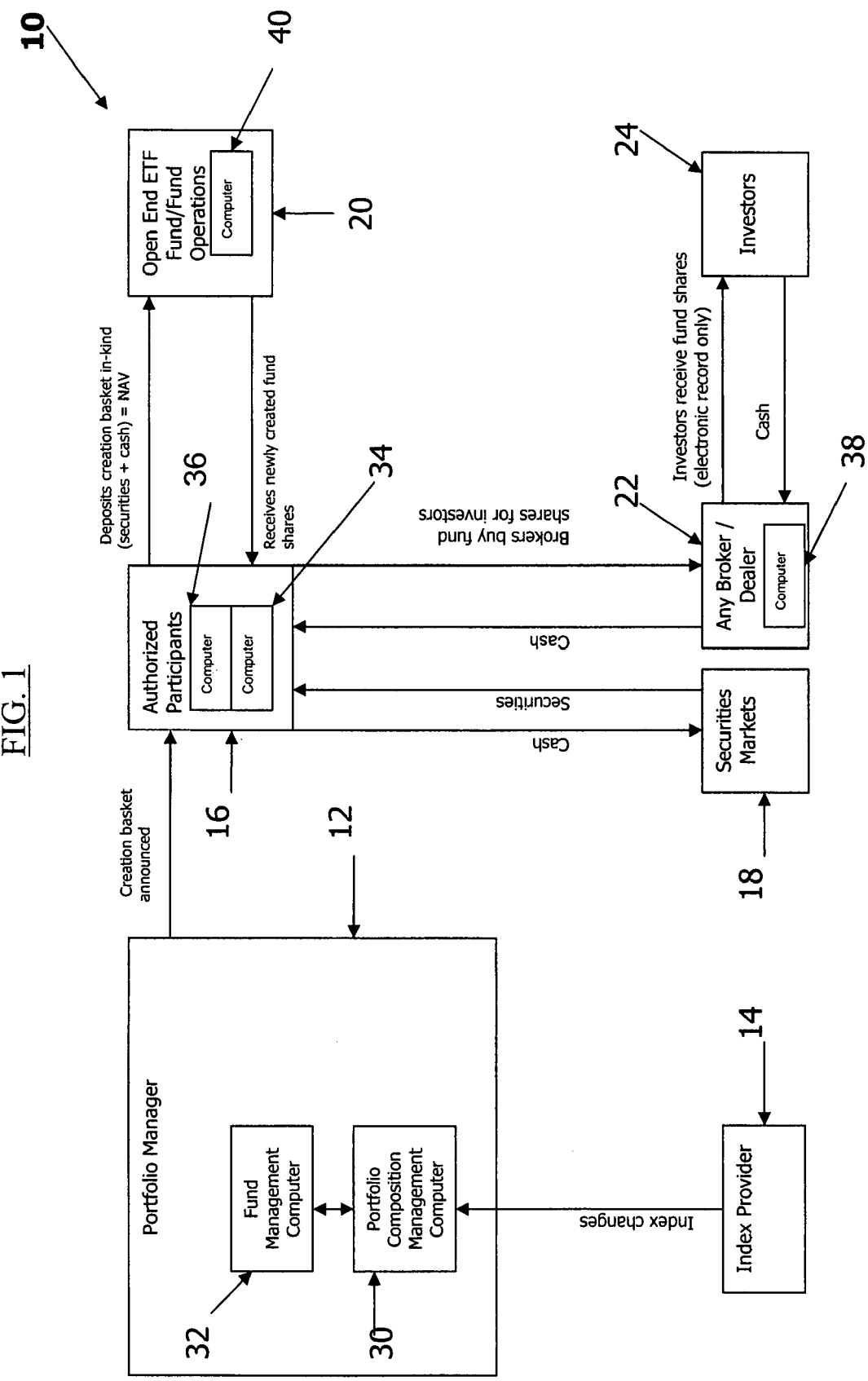
FIG. 1 is a block diagram of the systems used in the creation process for actively-managed exchange-traded funds (AMETFs, and improved indexed ETFs) according to the present invention.

The present invention, as described below, may be implemented in many different embodiments of software, hardware, firmware, and the entities illustrated in the figures. Any actual software code with a specialized control of hardware to implement the present invention is not limiting to the present invention. Thus, the operational behavior of the present invention will be described with the understanding that modifications and variations of the embodiments are possible, given the level of detail presented herein.

Example 1

Methods and Systems for Improved Fund Investment and Trading Processes

The preferred embodiment consists of major and several subsidiary components implemented through a variety of separate and related computer systems for the fund. These components may be used either individually or in a variety of combinations to achieve the joint objectives of protecting fund investors from the costs of providing liquidity to fund share traders, increasing the effectiveness of the portfolio management process and providing a new and improved way to trade exchange-traded fund shares on a secondary market. A number of the components of the preferred embodiment have more than one effect (e.g., shareholder protection plus improved portfolio management procedures). Each component can be implemented separately and is generally beneficial to fund shareholders even if the other components are not implemented at the same time or to the full extent described herein.

Certain components of the preferred embodiment improve expected performance and offer other advantages for investors in both AMETFs with a full active management investment process and a new kind of indexed ETF. This new kind of indexed ETF uses traditional indexing techniques but the index composition changes are not disseminated to the marketplace until after the fund portfolio manager has had an opportunity to change the fund portfolio to reflect any index changes. For the protection of investors, the portfolios of these new index funds are less transparent than the portfolios of existing benchmark index ETFs, but these funds are otherwise similar to other indexed ETFs. These funds can benefit from the same components of the present invention as the fully active AMETFs principally described herein. Consequently, these new index funds are covered by the description and claims as an AMETF variant. The Securities and Exchange Commission has indicated that these new index funds will be considered actively-managed funds for regulatory purposes. The secondary market trading system that is a component of the preferred embodiment is a useful method for secondary market trading of any securities basket product including existing index ETFs, HOLDRs (trust-issued receipts that represent beneficial ownership of a specified group of stocks), BLDRs (unit investment trust portfolios of publicly traded Depositary Receipts) and structured notes linked to a multi-security index or basket as well as the AMETFs described herein.

In this application, the ETF Share Class is sometimes referred to as the General Class of Fund Shares or Redeemable Shares to emphasize specific characteristics. The terms are interchangeable. A Business Day is any day the securities markets are open. Ordinarily a Business Day ends at 4:00 p.m. Eastern Time in United States securities markets, but some or all markets may close earlier on occasion, usually on the day before a holiday.

Features of the Preferred Embodiment that Primarily Protect Investors from Costs of Fund Share Trading 1. Early cut-off times for orders to purchase and redeem AMETF and ETF shares.

2. Entry and exit of investors through an ETF Share Class or an equivalent process to protect ongoing shareholders from the cost of providing liquidity to fund share traders.

Features of the Preferred Embodiment that Primarily Improve the Effectiveness of the Portfolio Management Process 3. Conversion of the ETF Share Class to and from Specialized Share Classes which, among other features, provide low-cost investment management services to institutional investors and convenience to individual investors who want to pay their advisors in a tax efficient way.

4. Less frequent intra-day dissemination of a precise AMETF portfolio valuation proxy.

5. Improving AMETF investor returns by concentrating portfolio manager effort on controlled-size funds; capping the assets the manager will accept for specific fund strategies and providing for a higher management fee on capped funds that perform well.

6. Organization of the AMETF investment manager to concentrate portfolio management efforts on the management of fund portfolios to reduce leakage of investment information by restricting the investment manager's activities. Voluntary lagged portfolio disclosure may be made more frequently than required.

The Secondary Market Fund Share Trading System Feature of the Preferred Embodiment 7. A trading system for AMETFs and other exchange-traded fund shares and basket instruments that parallels the traditional method for purchase and sale of conventional mutual funds at Net Asset Value (NAV) without compromising the investor protection provided by the exchange-traded fund creation and redemption structure.

FIG. 1 shows a generalized fund share creation system 10 which allows for the creation of an actively managed exchange traded fund (AMETF) and a new type of indexed exchange traded fund (ETF). The overall system 10 includes the actions of a portfolio manager 12 that manages the fund. The currently available indexed exchange-traded funds are benchmarked to an index such as standard published benchmark indexes including the Standard & Poors 500, the Russell 2000 and a variety of other domestic and international equity and fixed income indexes calculated and maintained by an index provider 14. Changes are made to such indexes from time to time and the changes are published widely. Changes in the indexes used for the improved indexed ETFs covered by the present invention will be communicated to the portfolio manager 12 confidentially by the index provider 14 or developed internally by the portfolio manager 12. If the fund is actively managed, or if the index is developed internally, the portfolio manager will determine any portfolio changes inside the portfolio manager 12. The system 10 also includes authorized participants 16, securities markets 18, a fund 20, broker/dealers 22 and investors 24.

The portfolio composition changes initiated by either the portfolio manager 12 or the index provider 14 are entered into a portfolio composition management computer 30 which is coupled to a fund management computer 32. The index changes for the improved index fund are not published to the world until after the fund has had an opportunity to implement the index changes in the portfolio. The portfolio composition changes to any AMETF including the new indexed ETFs need not be revealed except as required by regulators. The fund portfolio composition management computer 30 manages the relative weighting of positions in the portfolio and the fund management computer 32 translates the desired composition into creation and redemption baskets and orders to buy and sell securities for the portfolio. The fund management computer system 32 is also designed to ensure compliance with the cut-off times for fund trading and to provide an audit trail for the creation and redemption of fund shares as explained below. Links to and from the systems for monitoring and implementing creation and redemption orders are not shown in FIG. 1. It should be noted that the computer systems 30 and 32 and other computer systems described herein may be different groups of networked computers spread out over different locations.

The portfolio manager 12 supervises the daily process of determining Portfolio Composition Files (PCFs) reflected in the fund's published creation and redemption baskets. These creation and redemption baskets are published each day in advance of the start of trading of shares in the fund. The authorized participants 16 have a series of trading and trading management computers 34 that allow the exchange of securities, fund shares, and cash between the authorized participants 16 and the securities markets 18, broker/dealers 22 and the fund and fund operations 20. The authorized participants 16 each have a back office computer system 36 that performs functions such as confirming trades, accounting and risk management. The broker/dealers 22 each have a trading computer system 38 that facilitates trading and record-keeping in a variety of ways such as performing position management, billing and ensuring compliance with market rules. All of the transactions described herein are completed electronically via network connections including proprietary networks and the Internet.

The authorized participants 16 may create shares in the fund by depositing a creation basket of securities (plus or minus a cash amount) in exchange for shares of the General Class of Fund Shares or redeem shares by depositing some of the General Class of Fund Shares in exchange for a redemption basket of securities (plus or minus a cash amount). The authorized participants 16 are broker-dealers and can include market makers and arbitrageurs. The market makers create and redeem shares to manage their inventories of fund shares whereas arbitrageurs hope to profit from small pricing differences between the price of the General Class of Fund Shares and the cost of creating or disposing of a creation or redemption basket. The authorized participants 16 have entered into agreements with industry transaction clearing organizations and agents of the fund whereby they agree to certain conditions in the creation or redemption of fund shares. The authorized participants 16 transact in the securities markets 18 to acquire the securities that typically make up part of the creation basket.

New shares of the General Class of Fund Shares of the fund 20 are created when an authorized participant 16 deposits one or more creation baskets which consist of securities designated by the portfolio manager 12 as a Portfolio Composition File (PCF) and a cash balancing amount which may be a payment to or a payment received from the fund. In return for a creation deposit, an authorized participant 16 receives newly created fund shares from the fund 20. A variety of internal and external computer systems allow the authorized participants 16 to deal in the secondary market for securities with other broker-dealers 22 or directly or indirectly with investors 24. The portfolio manager 12 uses the fund portfolio composition management computer 30 and the fund management computer system 32 to make appropriate changes to the creation basket reflecting desired changes in the basket of securities to be received in a creation. The portfolio manager 12 also distributes the creation and redemption baskets to the authorized participants 16, and a variety of market data vendors (not shown). This information is typically distributed through the National Securities Clearing Corporation (NSCC), an industry utility which is a subsidiary of the Depository Trust and Clearing Corporation (DTCC). This industry utility also distributes an intra-day net asset value proxy to market participants through market data vendors. The fund management computer system 32 also handles a variety of accounting and operating functions including the generation of buy and sell orders for the fund's portfolio and generation of instructions for the fund's custodian and transfer agent functions, as subsystems linked to the computer 40 in operations of the fund 20. A similar process (not shown) is used to develop and disseminate the redemption basket and facilitate the fund share redemption process.

The trading and trade management computers 34 facilitate the exchange of securities (including securities represented in the creation and redemption baskets), fund shares and cash between the authorized participants 16 and the securities markets 18, other broker-dealers 22 and the fund 20. The fund management computer system 32, among other functions, initiates and confirms a variety of transactions, and maintains records and appropriate information for an audit trail of all orders entered with and by the fund. The various features of the preferred embodiment of the improved fund will now be described.

Early Cut-Off Times for Orders to Purchase and Redeem AMETF and ETF Shares

While the established ETF in-kind creation and redemption structure provides inherent protection from the grosser forms of mispricing and shareholder abuse uncovered in the mutual fund trading scandals, an active fund manager and an astute index fund manager need greater flexibility in managing the portfolio than is inherent in the exchange-traded index fund creation and redemption process as it is used today. Specifically, the necessary and appropriate publication of fully transparent creation and redemption baskets discourages effective implementation of portfolio composition changes by these index funds' managers if the notice of intent to create or redeem does not come early enough to permit the portfolio manager to adjust the portfolio for the effect of creation and redemption trades on the portfolio composition. In addition, the creation and redemption baskets for actively-managed ETFs may not reflect the manager's target fund portfolio as accurately as they typically reflect the composition of a benchmark index ETF. The manager of any exchange-traded fund needs the ability to trade between the time the fund receives notice of an incoming fund share creation deposit or an outgoing redemption basket and the time the net asset value is next calculated.

Thus the provisions of the preferred embodiment of the AMETF and ETF require early notice of orders to purchase or redeem shares in the funds. Early notice permits the portfolio manager to adjust the portfolio composition and incorporate the market impact of the entry or exit of shareholders on the prices used to calculate the fund's net asset value (NAV). The entering or leaving shareholders demand liquidity and—with early notice to permit portfolio composition changes—they pay for it indirectly. The portfolio manager's ability to adjust the composition of the fund portfolio after receiving notice of a creation or redemption of shares using previously posted creation and redemption baskets is essential to transferring the costs of entering and leaving the portfolio to the entering and leaving shareholders and relieving the ongoing shareholders of this burden.

In the preferred embodiment, a time between 2:30 p.m. and 3:30 p.m. is listed as the cutoff for purchase or redemption of baskets on Business Days when the market closing is 4:00 p.m. Eastern Time. This time is only an example of what might be an appropriate cutoff time for domestic equity portfolios. The cutoff time range is selected to be an early enough cut-off notice to permit the portfolio manager to adjust the portfolio to an appropriate portfolio composition by the time the market closes. In specific cases, as governed by the prospectus or subject to approval by the fund's board, the fund might set an earlier or a later cut-off time to provide the best possible service to entering and leaving shareholders without compromising the protection of ongoing shareholders. For funds other than domestic equity funds, different cut-off times will be required. In the case of international equity funds, for example, the appropriate early cut-off time for funds holding more than 3% of their assets in stocks traded on one or more primary markets outside the United States, could be 4:00 p.m. on any U.S. Business Day for pricing at the net asset value next determined for the fund after a full trading day in the primary markets for stocks accounting for 97% of the fund's equity portfolio. The 2:30 p.m. creation/redemption cut-off time for domestic equity funds and comparable rules for other types of portfolios solves one of the fund industry's greatest investor protection problems.

Figure 2A:
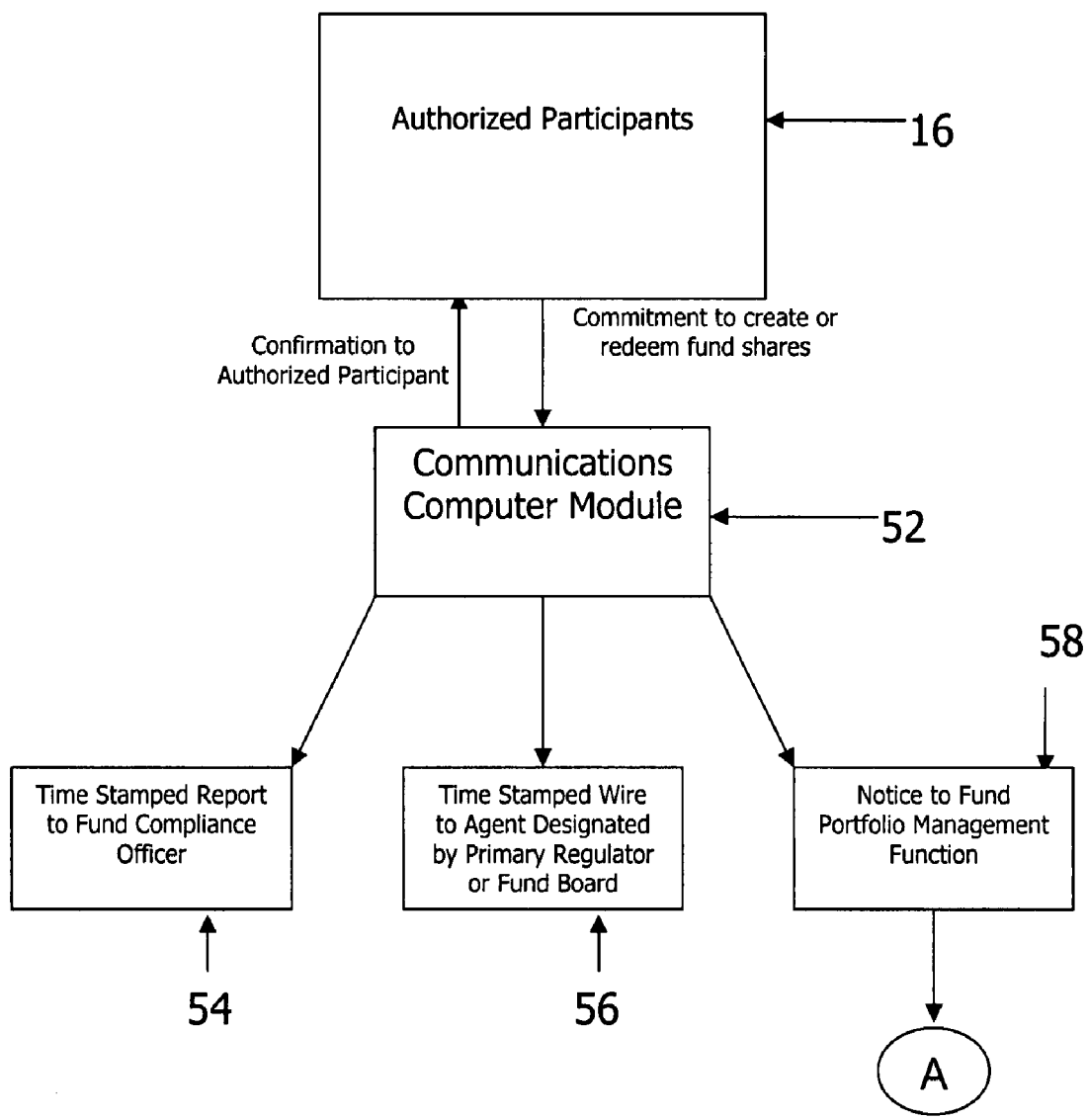
FIG. 2A is a flow diagram of the communications and control system used to implement and ensure compliance with early creation-redemption cut-off time notification requirements.

The early order cut-off system is illustrated in a flow diagram in FIG. 2A. In the preferred embodiment, the fund shares are exchanged for baskets of securities and cash. The notice by an authorized participant 16 of its commitment to create or redeem fund shares before the posted cut-off time is communicated to the communications computer module 52, which in turn confirms the receipt of a notification to the authorized participant 16 and simultaneously transmits a time-stamped report to a fund compliance officer 54, an agent 56 designated by the primary regulator or by the fund board and the portfolio manager 58. The portfolio manager 58 initiates any necessary portfolio modification transactions. The reports to the fund compliance officer 54 and to the agent 56 designated by the regulator or the fund board insure a record in a form which fund personnel will not be able to tamper with to conceal late entry of creation or redemption orders, thus providing protection from the late-arriving orders that have been a problem for conventional mutual fund shareholders.

Figure 2B:
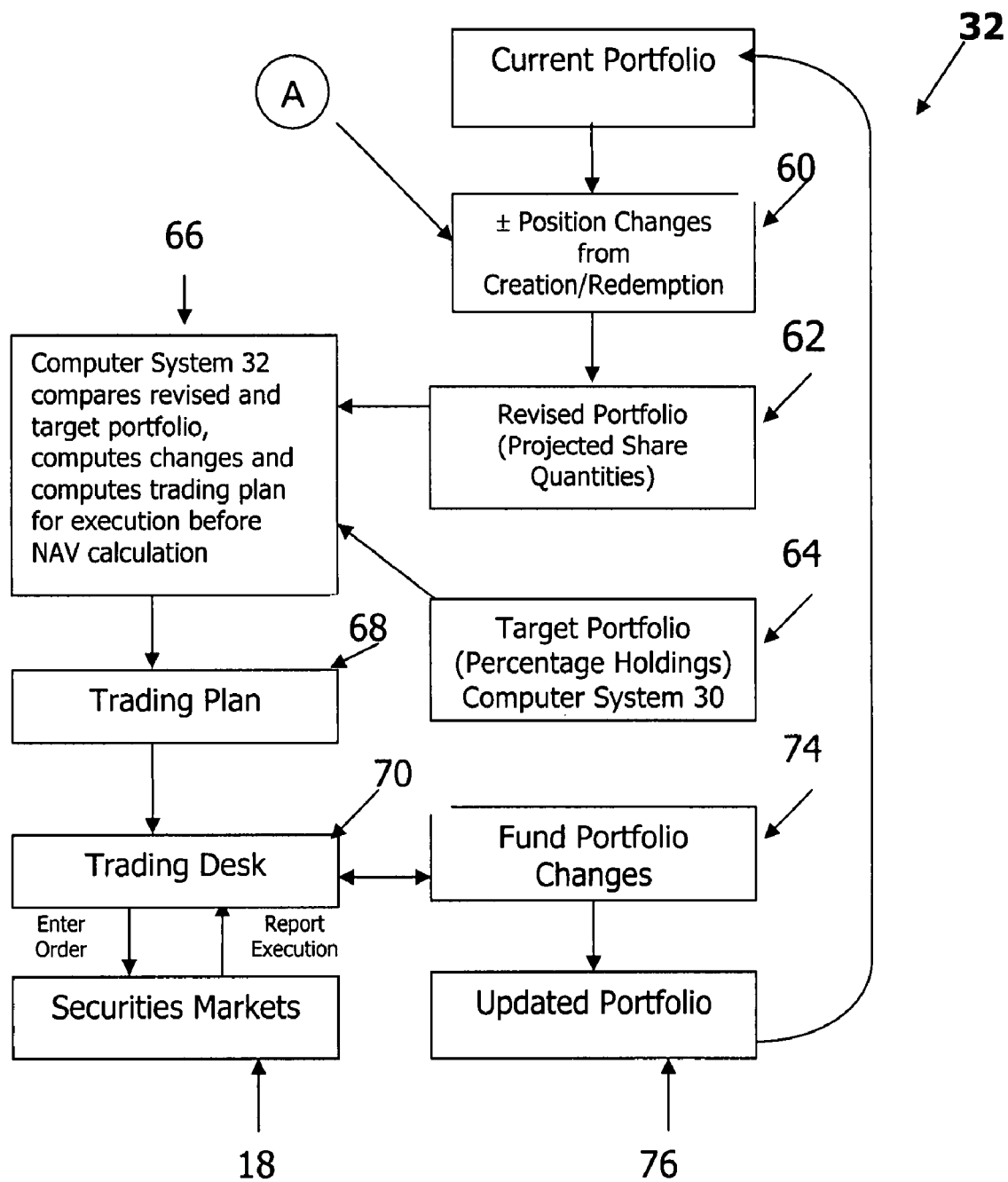
FIG. 2B is a flow diagram reflecting the portfolio and fund management process the portfolio manager uses to respond to early notice of a creation or redemption.

The portfolio management response to a creation or redemption order is shown in FIG. 2B. The notice of creation or redemption carries with it information about absolute and relative position changes that result from a creation or redemption. The portfolio position changes that result from the creation or redemption transaction(s) are broken out by the fund management computer 32 and appear in block 60 of FIG. 2B. The revised portfolio 62 is determined by the fund management computer 32 and a target portfolio 64 is created and maintained by the fund portfolio composition management computer 30. The target portfolio 64 reflects the percentage of holdings in each portfolio position developed by the fund portfolio composition management computer 30 and represents what the fund management computer 32 has determined is the appropriate portfolio the fund should hold at the end of the day. The fund management computer 32 compares the revised portfolio 62 to the target portfolio 64 and generates appropriate orders to buy and sell portfolio securities, developing a trading plan 68 for execution by the trading desk 70, preferably by the time of the NAV calculation. The trading plans are entered by a trading desk 70 (which is controlled by the fund management computer 32) into the transaction process in appropriate securities markets 18. Executions are reported as fund portfolio changes 74 and the updated portfolio 76, determined as of the close of the day's trading, becomes the then-current portfolio that is represented at the beginning of the process for the next trading day. Under this component of the preferred embodiment, an active portfolio manager and the manager of an improved index fund are given necessary and appropriate flexibility in managing the portfolio. The publication of totally transparent creation and redemption baskets which reflect the full fund portfolio composition discourages effective confidential implementation of portfolio composition changes by index fund managers. In AMETFs, including the improved ETF index funds, the creation and redemption baskets may not accurately reflect the portfolio manager's target fund portfolio. To protect ongoing shareholders, the manager of any exchange-traded fund, whether actively managed or based on an index, needs the ability to trade between the time the fund receives notice of an incoming fund share creation deposit or an outgoing fund share redemption basket and the time the net asset value is next calculated so that any transaction costs will be reflected in the prices used in the net asset value (NAV) calculations for the fund shares and the creation and redemption baskets.

Early notice permits the portfolio manager to adjust the portfolio composition and incorporate the market impact of the entry or exit of shareholders on the prices used to calculate the fund's NAV. The entering or leaving shareholders are demanding liquidity and they are indirectly paying for it. The portfolio manager's ability to change the composition of the fund portfolio after receiving notice of creation or redemption of fund shares using previously posted creation and redemption baskets is essential to transferring the costs of entering and leaving the portfolio to the entering and leaving shareholders and relieving the ongoing shareholders of this burden.

Entry and Exit of Investors Through an ETF Share Class or an Equivalent Process to Protect Ongoing Shareholders from the Cost of Providing Liquidity to Fund Share Traders.

Fully effective implementation of the improved fund requires that all entry of assets to and removal of assets from the fund is made through the generalized exchange-traded fund share creation and redemption process described above or a procedure providing equivalent protection for ongoing shareholders. This process protects ongoing fund shareholders from the costs of providing liquidity to entering and leaving shareholders. The late trading and market timing abuses uncovered at many mutual funds since September 2003 would not have been possible if the in-kind creation and redemption process, standard in exchange-traded funds, had been in effect for conventional mutual funds. The general requirement for in-kind creation and redemption not only protects fund shareholders from the cost of providing liquidity to traders by creating a clear audit trail for the order entry process, redemption in-kind (or partly in cash at the option of the fund) offers substantial advantages for taxable shareholders through deferral of capital gains realizations until a shareholder decides to sell fund shares.

Conversion of the ETF Share Class, Upon Shareholder Demand, to Specialized Share Classes A variety of Specialized Share Classes will be available for conversion from and back to the ETF Share Class used for fund shareholder entry and exit. These Specialized Share Classes provide custom management fee and marketing fee arrangements to accommodate different types of shareholders with investment objectives that coincide with the objective pursued by the fund. Among other features, these Specialized Share Classes are structured so that investors pay marketing and management fees in a tax-efficient manner and receive appropriate management fee discounts if they are large investors.

Under the U.S. tax code, separately billed fees paid by individuals for investment management services and various other services provided by financial intermediaries are not fully deductible against ordinary income taxes. For individuals subject to the Alternative Minimum Tax, separately billed fees may not be deductible at all. To preserve as much deductibility as possible, the most tax-efficient way for individuals to pay marketing and management fees is to pay them as management or service fees deducted from the investment income produced by funds in which they own shares. Separately billed marketing fees would similarly not be fully, or perhaps even partly, deductible and thus are often paid more tax efficiently when they are embedded in the cost of the fund and deducted from the income distributed by the fund.

Large institutional investors have more negotiating power than individual investors and traditionally pay lower investment management fees. However, in order to manage portfolios effectively and economically, it is best to bring all types of investors into a single pool rather than manage institutional portfolios separately from individual mutual fund portfolios. Such portfolio consolidation is another part of the purpose behind the use of Specialized Share Classes as explained below. Certain share classes would be available only to investors who were able to invest several million dollars or more in a particular fund. The structure of the share class relationships is shown in FIG. 3 and the computer system for share class conversion is illustrated in FIG. 4.

Figure 3:
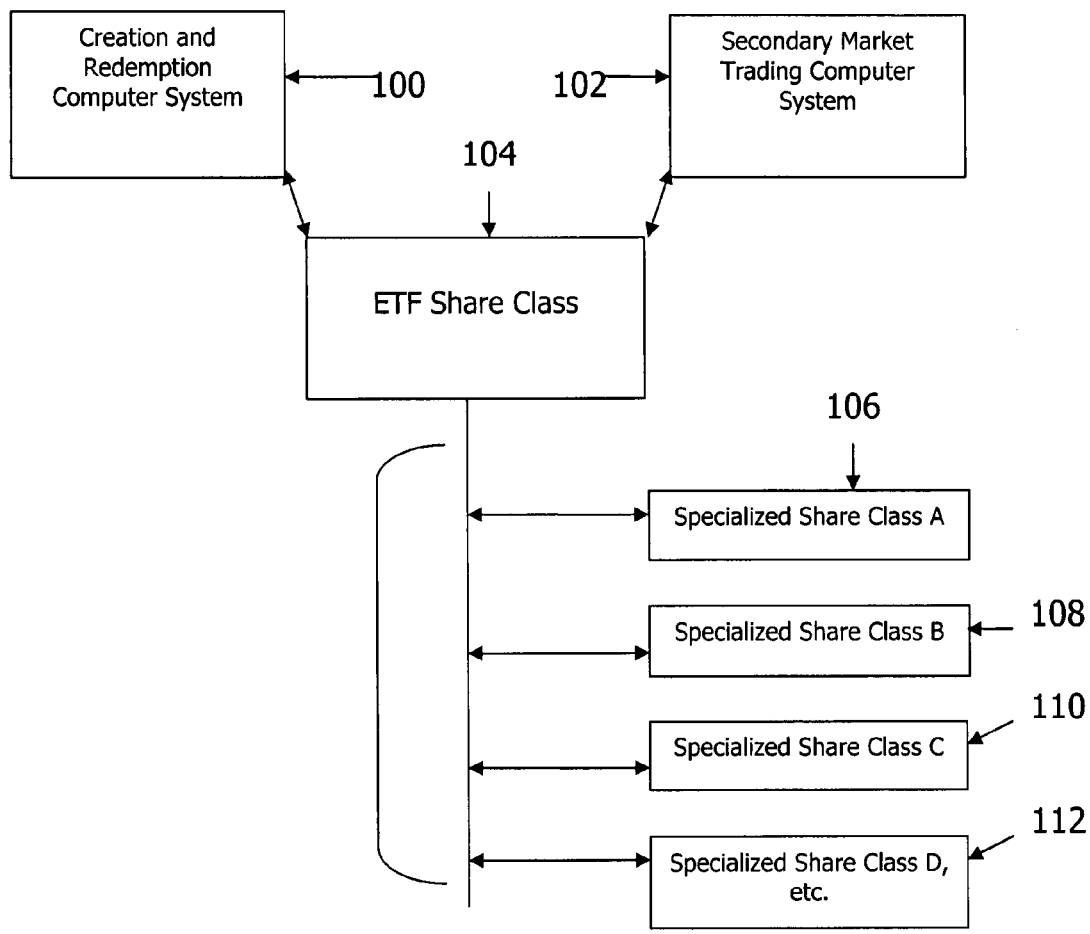
FIG. 3 is a block diagram of the relationship of all share classes.

The share class relationships illustrated in FIG. 3 show an ETF Share Class creation and redemption system 100 similar to the creation side of the system illustrated in FIG. 1, and a secondary market trading computer system 102 which includes functions reflected in the securities markets 18, the trading system 34 of the authorized participants 16 and the trading computer systems 38 of the broker/dealers 22 in FIG. 1. Creation and redemption (entry and exit of assets to and from the fund) involves an ETF Share Class 104. Although the Specialized Share Classes might be traded in a secondary market under some circumstances, the only share class that is ordinarily directly creatable or redeemable in a transaction with the fund is the ETF Share Class. Other share classes might include, as examples, Specialized Share Class A, a front end load share class 106; Specialized Share Class B, a back end load share class 108; Specialized Share Class C, a level load share class 110; and Specialized Share Class D, an institutional share class with a reduced expense ratio 112, for the convenience of various shareholders. Some users of these shares might want to facilitate the payment of a marketing fee to an individual or organization that provides sales and marketing services or advice. Other Specialized Share Classes would provide a variety of embedded marketing and management fees. The share classes A-D are intended to be illustrative, not exhaustive.

Figure 4:
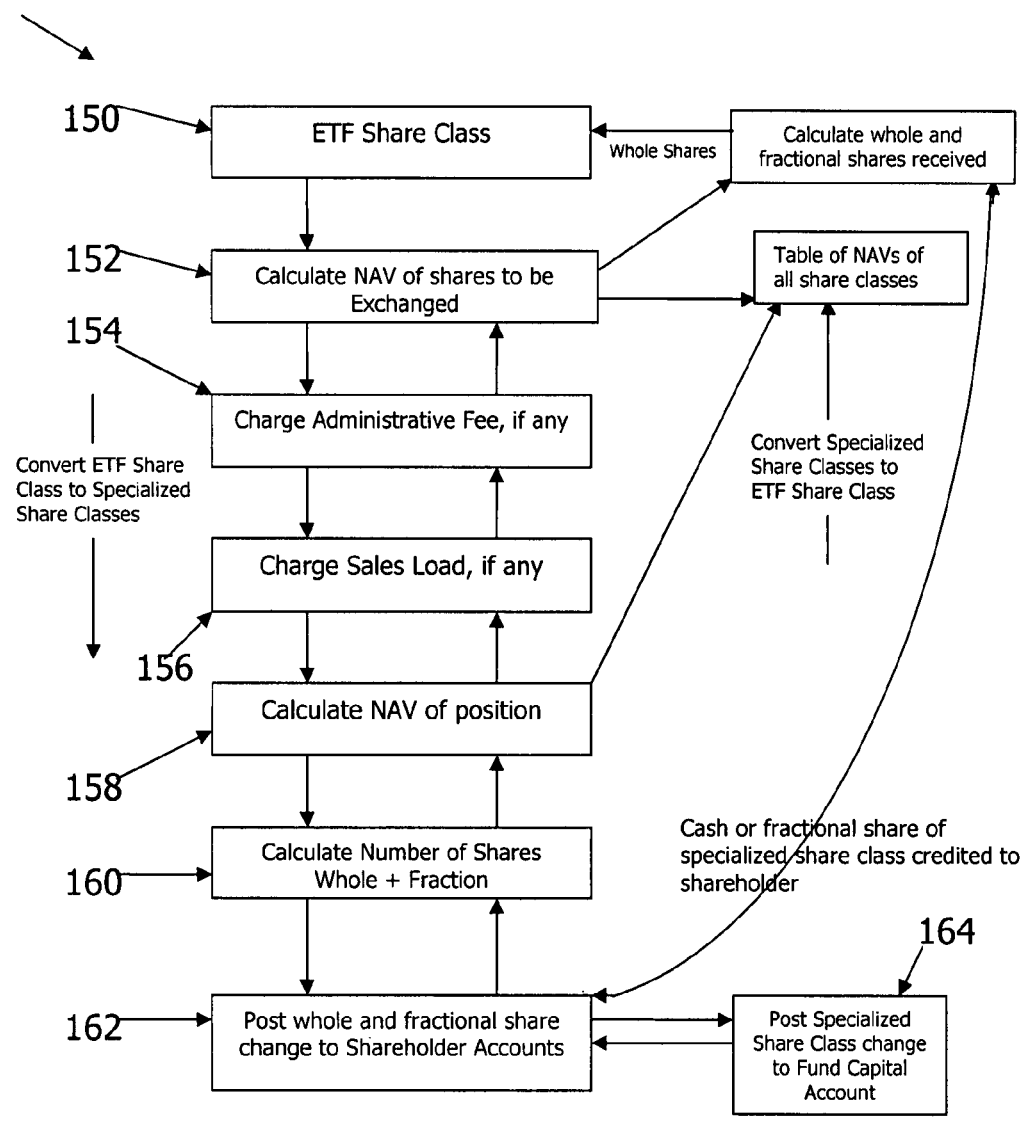
FIG. 4 is a flow diagram of the computerized system for conversion of the General Class of Fund Shares or ETF Share Class to and from Specialized Share Classes.

The share class conversions and exchanges in FIG. 4 are effected through the fund operation computer system 40 in FIG. 1. In FIG. 4, the process first identifies the ETF Share Class in step 150. The net asset value (NAV) of the shares to be exchanged is calculated in step 152. An administrative fee, if any is charged, is charged in step 154. A sales load, if any, associated with the particular Specialized Share Class is charged in step 156. For example, if the share is a share of Specialized Share Class A (with a front end load), the percentage charged for the front end load reduces the total value of the ETF Share Class shares entering into the calculation. The remaining value will determine the NAV available to be converted into Specialized Share Class A shares in step 158. The number of whole and fractional shares for the designated share class is then calculated in step 160. The whole and fractional share amount in the particular share class is posted to the fund's shareholder accounts in step 162. Changes in the Specialized Share Class are posted to the fund's capital account in step 164. Fractional shares will be available for all Specialized Share Classes. A Specialized Share Class may be created as the equivalent of the General Class of Fund Shares or ETF Share Class for fractional share positions under certain circumstances. When and if industry trading, clearing, transfer and custody systems are modified to accommodate fractional shares of fully DTCC-eligible securities, fractional shares of the ETF Share Class may be available. The process in steps 152 to 164 may be reversed to convert Specialized Share Classes back to the ETF Share Class. A table of NAVs of each share class is compiled daily by taking information from step 152 and step 158 and updating these NAVs for changes in the value of the underlying portfolio each day. These calculations are necessary because when a sales load or a different management fee is charged to a particular share class, the NAV of that share class will change in different ways than the ETF Share Class NAV changes, and subsequent transfers to and from that share class must be at values consistent with charges to investors using that class. ETF share equivalents (which may be needed in conjunction with the implementation of a cap on the issuance of new fund shares) are calculated using the ratios of the Specialized Share Class NAVs to the ETF Share Class NAV and adding all the ETF share equivalents of the outstanding shares.

Table 1 below shows the relationship of various alternative share classes to the ETF Share Class based on the ratio of their respective share classes' NAVs to the ETF Share Class NAV.

TABLE 1

|  | Number of Shares Outstanding in Class | ETF Share-Equivalents Outstanding |
|---|---|---|
| ETF Share Class | $X_{ETF}$ | $X_{ETF}$ |
| Specialized Share Class A | $X_A$ | $_aX_A$ |
| Specialized Share Class B | $X_B$ | $_bX_B$ |
| Specialized Share Class C | $X_C$ | $_cX_C$ |
| Specialized Share Class D, etc. | $X_D$ | $_dX_D$ |
| Sum of ETF Share Equivalents = |  | Y |

In Table 1, a, b, c and d are equal to the ratio of their respective share class's NAV to the ETF Share Class NAV. The sum of the various share class ETF Share Class equivalent net asset values in total (Y) is compared to the fund share cap stated in a fund's prospectus or adopted by the fund board. If Y plus the ETF Share Class equivalents in a standard Creation Unit exceeds the designated cap, no creations will be permitted until a redemption occurs or the cap is increased under the terms of the fund prospectus.

Less Frequent Intra-Day Dissemination of a Precise AMETF Portfolio Valuation Proxy Another feature of the improved fund is an increase in the interval between "precise" intra-day fund share net asset value (NAV) proxies calculated and distributed by NSCC, an industry utility, through electronic quotation vendors during the trading day. The net asset value proxy is based on the contemporaneous bids and offers for each security in the portfolio translated into a per-ETF Share Class share value expressed as a bid and offer or as the midpoint between the bid and the offer. The time interval between publication of these precise net asset value proxies would be greater than the 15-second interval common with today's index ETFs, say, between 5 minutes and 60 minutes in the preferred implementation, and may vary within that range at the discretion of the fund's board of directors, subject to regulatory approval.

The reason for reducing the frequency of net asset value proxy dissemination is that dissemination every 15 seconds provides a total of more than 1500 fund share values during the standard trading day. Given that AMETFs will usually have fewer positions than a broad market index exchange-traded fund, every 15-second dissemination provides a great deal of information and would permit an astute analyst to back calculate the composition of the portfolio and learn inappropriate details about the fund's ongoing trading activities. The appropriate interval for precise NAV proxy dissemination will vary for different funds depending in part upon the number and nature of the securities in the portfolio. However, the appropriate time interval for publication of precise indicative values does not bear a rigid relationship to the number of securities in the portfolio or any measure of portfolio turnover. The fund directors would determine the interval between precise portfolio valuation proxies subject to regulatory approval. Reducing the amount of information on the content of the portfolio provided to the marketplace will protect the fund shareholders from front-running of transactions the fund portfolio manager is making to modify the fund portfolio.

The fund management computer system 32 in FIG. 1 supplies data to a secure market data server (not shown) that continuously updates the net asset value proxy of the fund shares as bids and offers for the portfolio securities change throughout the day. Net asset value proxies are published at an interval approved for each fund by the fund board. The current standard interval for indexed ETFs is every 15 seconds. If an approximate indicative value is required at 15-second intervals for the use of investors and market makers, a randomized process will meet this need while reducing the portfolio information content of net asset value proxy calculations disseminated between precise calculations. Specifically, the values between periodic releases of precise values based on the actual portfolio could be based on the 15-second interval precise portfolio values incremented or decremented by a number drawn at random from a disclosed probability distribution. The random increments and decrements in these values will eliminate the opportunity to use the net asset value proxy publication to determine portfolio composition, yet avoid an indicative price too far away from the actual portfolio value to be useful to market participants.

Improving AMETF Investor Returns by Concentrating Portfolio Manager Effort on Controlled-Size Funds; Capping the Assets the Manager Will Accept for Specific Fund Strategies and Providing for a Higher Fee on Capped Funds that Perform Well In the preferred embodiment, after the AMETF complex reaches a size specified in its fund prospectuses, the investment process used by the management company would be used almost exclusively for products using the fund structure and process. A common set of directors will typically be directors of every fund managed using the fund family's common investment process and the directors will be responsible for ensuring that the investment process has adequate capacity to serve additional funds with different objectives without a detrimental effect on existing funds before the addition of funds not listed in the original documentation. In the preferred embodiment, the funds' prospectuses do not permit the fund manager to manage separate accounts or institutional pooled accounts except as share classes converted from ETF Share Classes. Rather than manage investment products that present a conflict of interest for the ETF Share Classes and the Specialized Share Classes converted from them, the investment manager might sell any excess research or idea capacity along a particular dimension to another investment manger on terms to be approved by the fund's directors. The manager could also have the opportunity to earn a higher fee on a capped portfolio.

Figure 5:
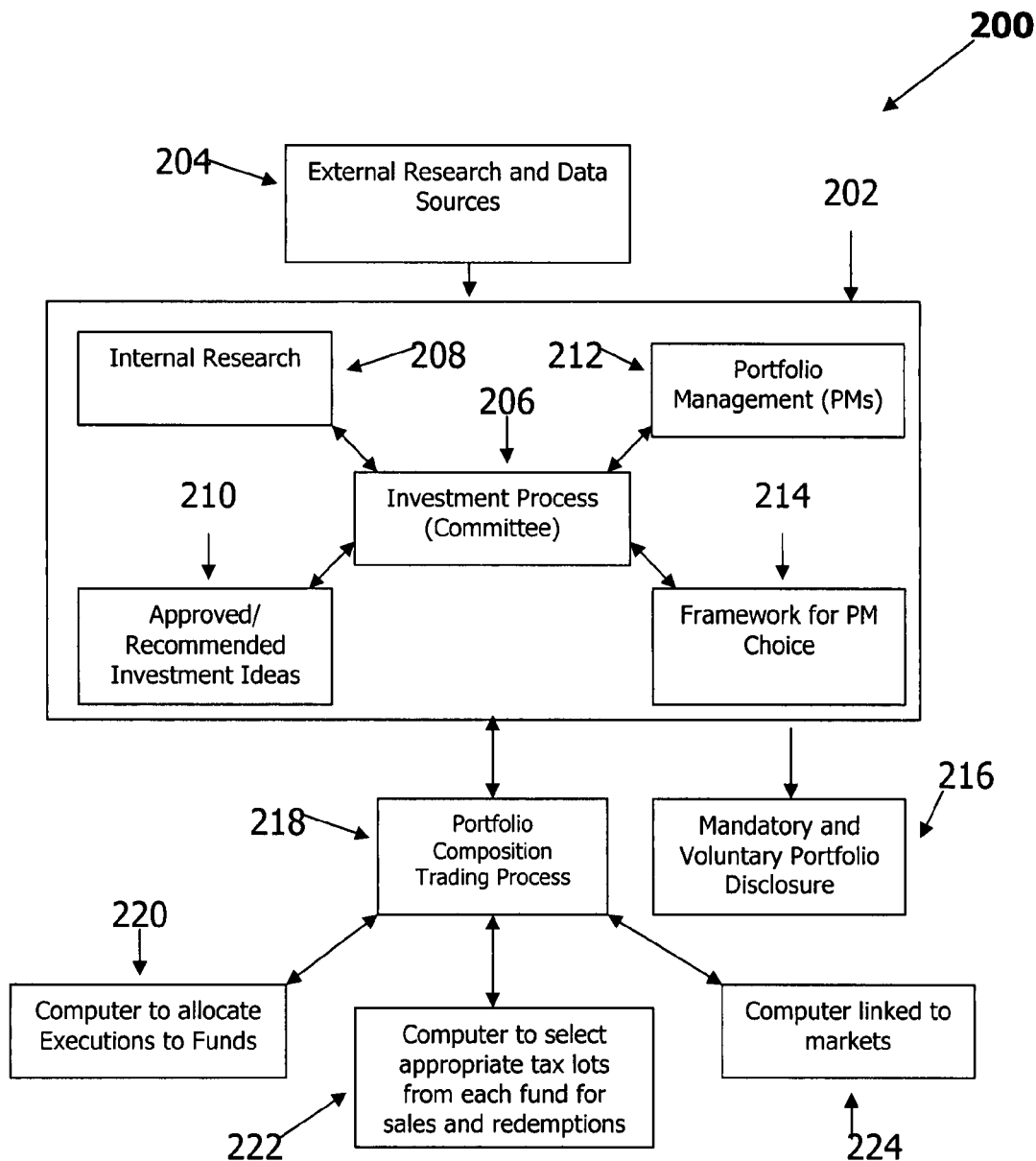
FIG. 5 is a block diagram of the portfolio management and trading system dedicated to the management of a family of AMETFs and other funds.

FIG. 5 illustrates the structure of such an AMETF dedicated portfolio management and trading system 200 which is part of the systems maintained by the portfolio manager 12 in FIG. 1. The portfolio management and trading system 200 is based on an investment process 206 incorporated in an investment management process 202 that also includes input from external research and data sources 204, internal research 208 and portfolio managers (PMs) 212 who are the essential and principal members of the investment process committee. The investment process committee 206 produces approved and recommended investment ideas 210 and a framework for portfolio management choices 214 to be used in the management of the organization's AMETF products. The investment management process 202 prepares the periodic mandatory and any voluntary fund portfolio disclosures 216. Voluntary disclosures could be made available with greater frequency than regulators require with the approval of the fund board. The investment management process 202 delivers instructions for changes to each fund through a portfolio composition trading process 218 that manages portfolio composition trading using the fund portfolio composition management computer system 30. The portfolio composition trading process 218 is indirectly involved in the allocation of executions to the various funds 220 using the fund management computer system 32 in FIG. 1. A tax management computer 222 stores tax data and selects appropriate tax lots of securities from each fund portfolio for delivery against sales and redemptions. A trading desk computer 224 links to various markets where trades are executed to complete the portfolio composition trading framework.

In the preferred implementation, the size of certain funds will be capped by provisions in the fund's prospectus or by a fund board resolution. The principal purpose of capping the size of some funds is to improve the probability that the funds will enjoy superior long-term performance for the benefit of their shareholders. In addition to or as a substitute for a fixed cap set by the prospectus, the fund could rely on fund board resolutions or use a computer system and database to compute the optimal size of a fund to determine the fund asset level at which a cap should be imposed by the fund board.

Figure 6:
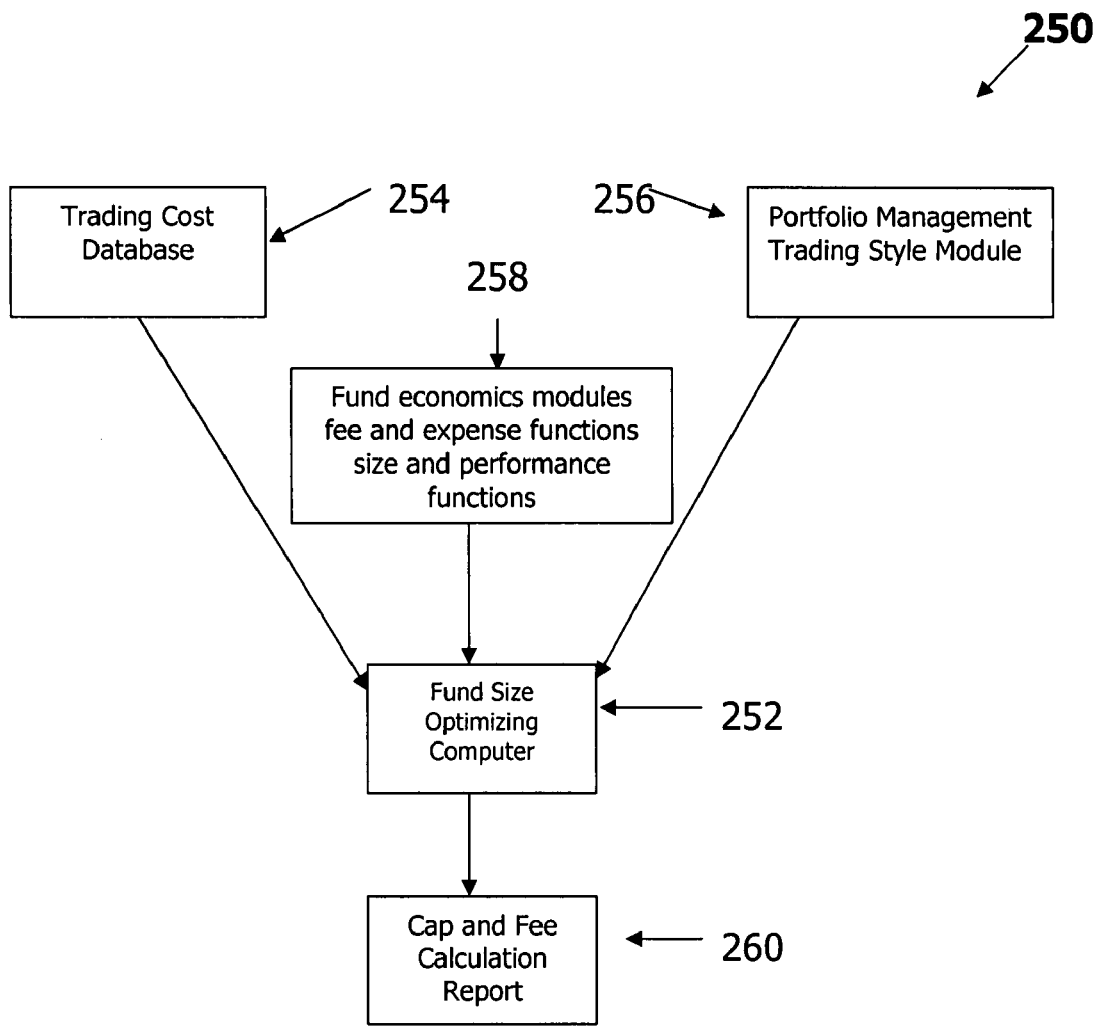
FIG. 6 is a block diagram which illustrates a computer system and databases used to estimate the optimum size of a fund for a cap calculation which may be used instead of embedding a fixed cap on the number of shares outstanding in a fund prospectus.

FIG. 6 is a block diagram of a computer system 250 designed to cap the size of a fund. It includes a fund size optimizing computer 252 coupled to a trading cost database 254 which includes, among other features, databases that link trading costs to the size of the positions which the family of funds as a group hold in individual securities with varying capitalizations and levels of trading activity. A separate trading style module 256 will contain information on the various fund trading styles and the trading cost experiences of the fund's portfolio managers and traders under different market conditions. A cost module 258 contains fee and expense functions for different fund sizes and performance functions based on industry experience and the experience of the managers employed by the funds. In addition, the cost module 258 has functions relating to the interaction between the fee structure and methods the funds are permitted to use to require re-conversion of low management fee Specialized Share Classes to the ETF Share Class and an algorithm for changing the management fee on the exchange-traded share class in response to performance achieved by the fund's portfolio management process. The fund size optimizing computer 252 produces an appropriate cap and fee calculation report 260 for recommendation to the fund board.

The purpose of capping some funds is to create an environment which eliminates the traditional conflict between the interests of investors and the interests of investment managers which usually leads managers to accumulate large pools of assets that make superior investment performance difficult or impossible.

With the exception of some funds holding predominantly large capitalization stocks, the investment manager will state in the fund prospectus or the fund board will determine the maximum number of ETF equivalent shares that each fund in a family will issue. The manager may also use a controlled share-growth formula to prevent growth that will swamp the manager's ability to achieve superior performance for the fund. The cap could be increased or the formula modified at a future date if the manager was comfortable with its ability to manage a larger portfolio and if the fund board or shareholders approved a change.

One purpose of the computer system 250 in FIG. 6 is to provide fee incentives for the fund manager to manage a smaller pool of assets more intensely and more effectively, providing better performance for investors and equal or better compensation for the fund managers without increasing the size of the fund portfolios to the extent that superior performance is no longer possible.

The prospectus of a capped fund will state the maximum number of ETF equivalent shares that the fund will issue or will otherwise describe the process for limiting the size of the fund. The Specialized Share Classes may have share prices different from the per share price of the ETF Share Class. The ETF share equivalent of a share in a Specialized Share Class will be equal to its net asset value (NAV) divided by the NAV of the ETF shares. If the maximum total ETF share equivalent issuance for a fund is reached, no more shares will be issued unless shares are first redeemed or the maximum issuance is increased. In the preferred embodiment, an authorized participant that redeems shares to reduce its inventory of shares in a fund that has reached its maximum size will have the exclusive right to re-create those shares at net asset value (NAV) plus a standard creation fee for a period stated in the fund prospectus. If the redeeming authorized participant does not re-create within the stated period, the fund board could shrink the fund by lowering the cap.

Capping fund size in some portfolios can solve the problem of finding a superior active manager and having assets managed by that manager over a long period of time. Capping should permit portfolio managers to post better performance records and, subject to the operation of a process to increase the management fee as a reward for good performance, earn more income. With fund management fee increases linked to multi-year performance and capped fund shares trading at a premium to net asset value (NAV), both investors and managers can earn as much or more than they might earn from larger portfolios using traditional fund and fee structures. The new fee structure will provide an incentive for performance more in line with the fund shareholders' interests than current fee structures.

Figure 7:
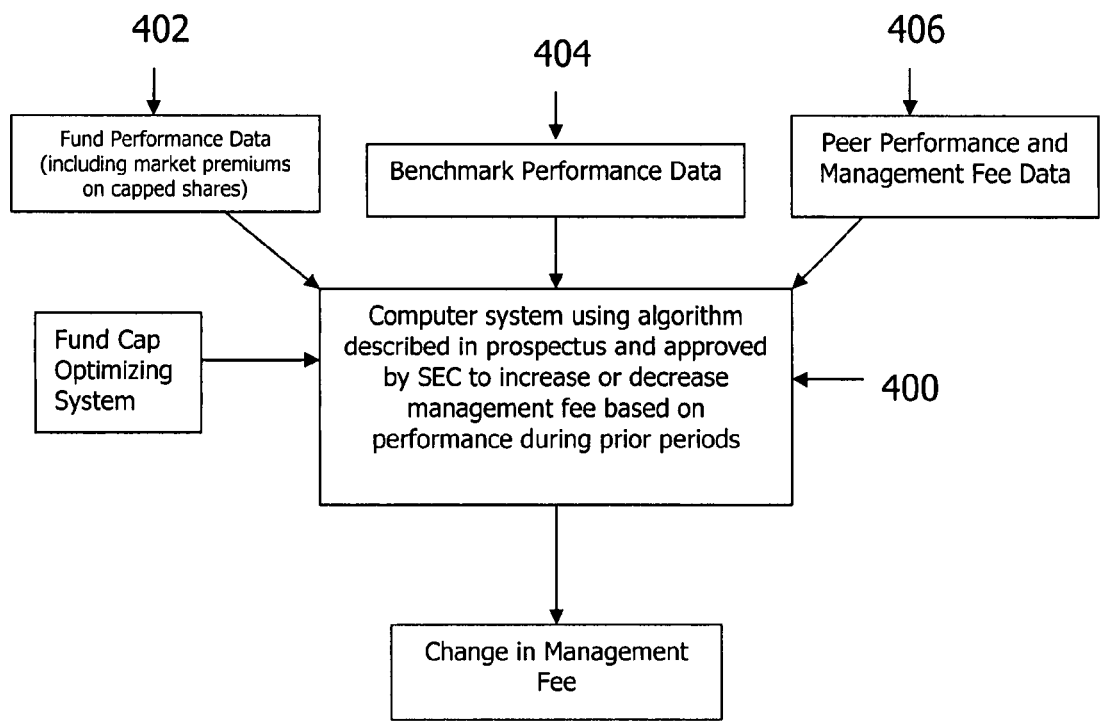
FIG. 7 is a block diagram illustrating a system for calculating changes in a fund management fee in response to changes in fund performance and other variables.

FIG. 7 shows a computer system 400 and associated data sources used to determine the management fee for a capped fund according to one aspect of the present invention. The computer system 400 includes a program based on an algorithm described in the fund prospectus and approved by the SEC that permits the fund board to increase or decrease the management fee based on fund performance during prior periods. The computer system 400 uses a fund performance data source 402, a benchmark performance data source 404 and a peer performance and management fee data source 406. The performance data will include traditional performance comparisons plus measures of average premiums over NAV that the ETF Share Class achieves. Such premiums may lead to an increased management fee in at least two ways. First, if the ETF Share Class trades at an average premium over NAV that exceeds a level stated in the prospectus for a specified time, the holders of Specialized Share Classes with discounted management fees can be required to convert their shares to the full fee ETF Share Class. Second, if the premium persists at a designated level, the management fee can be increased to a multiple of the base rate. Appropriate terms to reduce fees if performance drops below a specified standard are part of the algorithm. The algorithm reflects the fact that the manager is giving up the ability to increase assets beyond the cap on the strength of a superior performance record. Thus, the potential for fee reduction is more limited than the potential for a fee increase in some circumstances. The computer system 400 outputs appropriate changes in the management fee for consideration by the fund board or automatic implementation under terms stated in the fund prospectus.

The creation and redemption rules are designed to encourage occasional redemptions after a fund reaches its cap in terms of number of ETF share equivalents. The existence of a cap without modest variability in the number of shares outstanding forecloses redemptions and leads to much greater share price volatility in the secondary market trading of the capped funds' shares than is necessary or desirable. The absence of redemptions could also reduce the tax efficiency of the fund. It is appropriate that a market maker with a temporary excess inventory of shares in a fund is able to redeem fund shares from time to time, bringing the size of the fund below the stated ceiling on the number of shares the fund would issue. This redemption permits the fund share market price to more closely reflect changes in the fund's net asset value and avoid significant fluctuations in any premium which the market price of the shares may carry over the fund's net asset value. Subsequent to such a redemption and for a period designated in the fund's prospectus, the redeeming authorized participant has the exclusive right to re-create the shares it had redeemed under terms established by the fund prior to its closing to new creations. These terms are essentially a re-creation of the shares redeemed with an in-kind deposit priced at net asset value plus a normal creation fee. If the redeemer does not re-create within the designated period, the fund has the option of either shrinking the cap on the number of shares it would issue (to shrink the fund because management has determined that the capped size was too large) or permitting any authorized participant to create shares up to the share ceiling under standard (NAV) terms for fund share creations.

This redemption and re-creation provision helps market makers with fund share inventory management. It moderates fluctuations in any premium on the fund shares' price in the secondary market once the ceiling on share issuance is reached. It also provides a mechanism whereby an occasional in-kind redemption can enhance the fund's tax efficiency. The expiration of the right to re-create also permits the fund board to reduce the fund's maximum capitalization if the fund's market space becomes less liquid or if the original ceiling on share issuance was not set low enough to protect the fund from being overwhelmed with assets. Any decision to shrink the market capitalization originates with the manager, with the fund board or with shareholders by petition.

Organization of the AMETF Investment Manager to Concentrate Portfolio Management Efforts on the Management of Funds to Reduce Leakage of Investment Information by Restricting the Investment Manager's Activities.

Another feature of the preferred implementation of the present invention preserves the value of the output of the investment process more directly. With a unified portfolio management and trading operation and limitations on product offerings, shareholders are well-protected from inappropriate dissemination of investment information. Specifically, the value of an investment idea is preserved until the funds managed by the organization have time to buy or sell as much as they want of a particular security.

One of the weaknesses of the typical active manager's investment management process—in which different types of accounts are buying or selling the same security—is information leakage. With a single pool for each fund and funds as the manager's only product, there are no conflicts associated with the order in which transactions are made, and there is no leakage to outside organizations from trade confirmations sent to owners of separate accounts and individuals associated with institutional and non-public pooled portfolios. Of all possible structures for the collective management of investment portfolios, pooling is accomplished most efficiently and most confidentially with multiple-share-class funds that control publication of their portfolios.

With the concurrence of a fund's directors, the investment manager may disclose a recent fund portfolio to the public at appropriate intervals by any means the appropriate regulatory authorities approve. These may include posting on a website or other electronic dissemination. The disclosure process permits free and equal access to the information by any investor with Internet access. When implied portfolio disclosure is made through changes in creation and redemption basket composition, these changes are appropriately disseminated through public postings. Formal portfolio disclosure can be no less frequent than the quarterly disclosure with a 60-day lag now required of conventional mutual funds. However, in many cases, fund managers will be encouraged by market forces to make more frequent portfolio disclosures to increase the efficiency of secondary market trading in the fund shares without harm to ongoing fund shareholders from such disclosures. The computer model disclosed in FIG. 5 monitors both portfolio construction and transaction plans and governs and implements any portfolio disclosures that take place at shorter intervals than the interval imposed by regulators.

Figure 8:
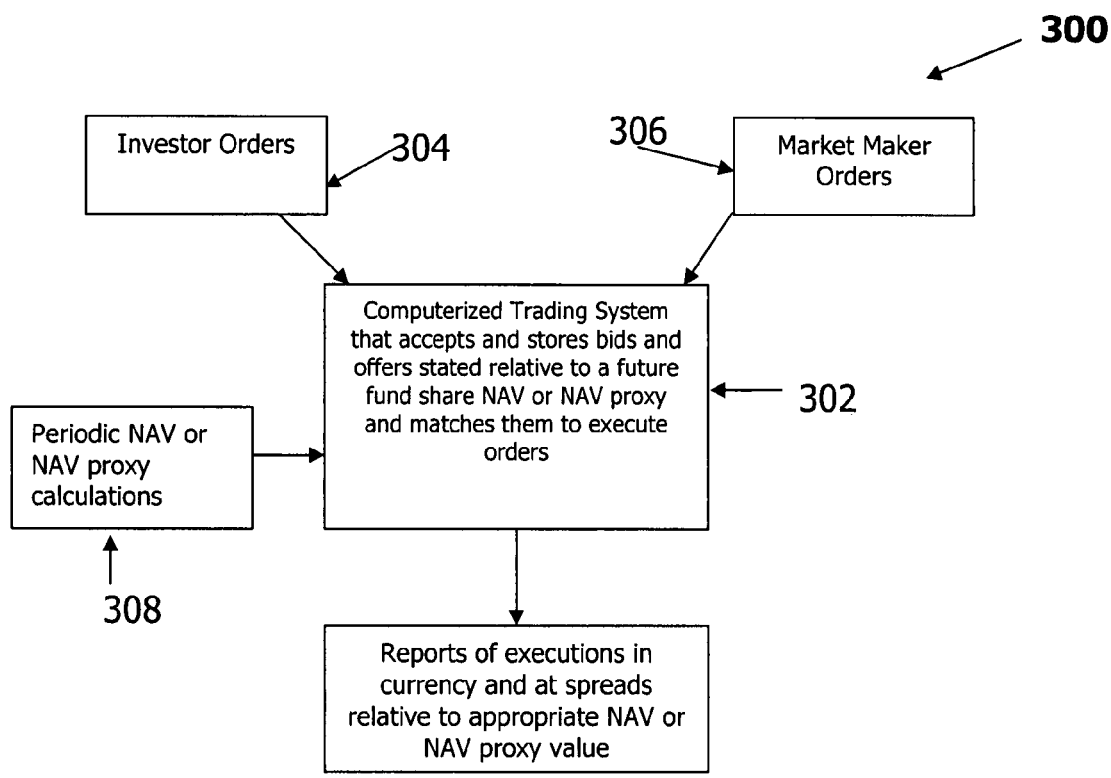
FIG. 8 is a block diagram of a computerized market for trading fund and other basket shares at prices linked to the future net asset value of the share classes.

A Trading System for ETFs and Other Basket Instruments that Parallels the Traditional Method for Purchase and Sale of Conventional Mutual Funds at Net Asset Value (NAV) without Compromising the Investor Protection Provided by the Exchange-Traded Fund Creation and Redemption Structure Licenses may be offered to appropriate trading venues to use computer systems designed to permit special intra-day auctions linked to periodic disclosure of the intra-day valuation proxy and the closing net asset value (NAV). These auctions will provide a trading mechanism intermediate in some respects between those of mutual funds and today's benchmark index ETFs. FIG. 8 shows a computerized market 300 allowing trading of ETF shares at prices linked to future NAV calculations which may be used as a pricing basis. The market 300 is centered on a computerized trading system 302. The computerized trading system 302 matches orders in terms of their statement of a bid or offer below, at or above the NAV or NAV proxy to be calculated on prevailing bids and offers for portfolio holdings and disclosed at a specified future time. The computerized trading system 302 accepts orders from investors 304 and market makers 306. The computerized trading system 302 receives periodic NAV calculations and NAV proxy calculations 308. The computerized trading system 302 produces reports of executions in currency and at spreads relative to the daily closing NAV or NAV proxy values posted at specified times. The trading system accommodates trading in any fund, trust or structured product for which a net asset value based on the prices of its holdings of securities or other financial instruments is periodically calculated.

The NAV-linked executions at stated times permit investors to place orders with market makers through traditional financial intermediaries for purchase and sale of shares at a price linked to an hourly posting of the intra-day net asset value proxy or at the official end-of-day net asset value. In some cases, these trades may be done at a spread and in others the market maker may provide a guarantee of a fill at net asset value with no spread or commission—the effective execution cost depending in part upon the time interval between the entry of the order by the investor or the investor's agent and the price calculation. Instead of making a market at a specific price, the market maker bids and offers at a spread below, at and above the next reported hourly intra-day proxy value or the closing NAV. The spread away from the designated NAV determination will generally widen as the time of price determination draws closer because the market maker has less time before the price determination to hedge or offset risk with another trade.

Using the closing NAV as the target in such a trading structure makes the pricing and trading of ETFs much like the conventional mutual fund trading process. Market makers may be willing to guarantee execution with no commission at the closing net asset value on orders received far enough in advance. Obviously, an order for execution at today's NAV with no commission is not acceptable to a market maker after a certain time. The cut-off time for such an order may vary among funds and among market makers.

While mutual fund transaction systems are designed to accommodate trades denominated in dollars with share positions expressed as whole and fractional shares, stock and ETF trading systems and, most significantly, clearing systems do not accommodate fractional shares. Some firms show fractional stock or ETF shares in a customer's account but such fractional share positions cannot be transferred electronically to other firms. The trading mechanism of the preferred embodiment converts part or all of a dollar-based transaction into a Specialized Share Class with the same per share NAV as the General Class of Fund Shares and the appropriate share position will appear in the customer's account as a conventional fund share class position. This feature adds to the similarity of this trading process to the traditional mutual fund transaction process.

Cost Savings to Investors and Investment Managers

The following table, Table 2, compares estimates of the costs experienced by a typical long-term investor in an actively-managed domestic equity mutual fund to the costs of an actively-managed domestic equity version of the new fund according to the present invention. The potential cost/performance difference is as much as 4.10% per year. The new structure offers substantial advantages to investors, largely from eliminating unnecessary or inappropriate costs and fund size-related performance penalties.

TABLE 2

|  | Equity Mutual Fund | New Equity Fund |
| --- | --- | --- |
| Expense Ratio | 1.0% | 1.0% |
| Portfolio Composition Trades Inside the Fund | 1.5% | 1.5% |
| Fund Share Trading Liquidity Costs | 1.4% | |
| Leakage of Investment Info/Index Publication | 0.35% | |
| Fund Supermarket vs. Multi-Share Class ETF | 0.35% | |
| Performance Penalty from Oversized Funds, Net of Higher Performance Fee | Up to 2.00% | |
| Annual Total | 6.60% | 2.50% |

In Table 2, there are no recurring fund share trading liquidity costs for the new fund structure because any costs to enter and leave the ETF Share Class are paid by the trading shareholder only when entering or leaving the fund. The estimate of the cost of information leakage is based on an estimate of half the typical annual cost of the publication effect of S&P 500 composition changes. The fund supermarket costs are usually annual costs to all of a fund's shareholders in no transaction fee (NTF) shares, whether they use the fund supermarket or not. Some annual supermarket fees paid by funds are higher than 0.35%. There are no annual marketing fees in the new structure without a specific agreement by the investor to pay them in connection with ownership of a Specialized Share Class. The performance penalty associated with fund size is an estimate based on limited data from active fund managers and trading cost analysts.

It will be apparent to those skilled in the art that various modifications and variations can be made in the method and system of the present invention without departing from the spirit or scope of the present invention. Thus, the present invention is not limited by the foregoing descriptions but is intended to cover all modifications and variations that come within the scope of the spirit of the present invention and the claims that follow.

Example 2

Systems, Methods, and Computer Program Products for Trading Financial Instruments on an Exchange Additional embodiments of the invention shall now be described in terms of exemplary systems, methods, and computer program products for trading financial instruments on an exchange or an electronic communications network (ECN). Within such embodiments, financial instruments may include, but are not limited to securities, mutual funds, exchange-traded funds, open-end funds, closed-end fund, stocks, swaps, futures, and derivatives, either alone or in combination. Further, the embodiments described herein may accommodate any additional financial instrument that would be apparent to one skilled in the art and that may be traded on an exchange of ECN.

According to embodiments of the invention, a wide range of financial instruments, trading techniques, and trading processes may be accommodated with changes in exchange order formats, structures, and processes with the common element being a settlement price, a trade volume, or any combination of a settlement price and a trade volume to be determined in the future. Embodiments of price- and volume-contingent trading processes include, but are not limited to:

a. Volume-Weighted Average Price (VWAP), which represents a total price of instruments traded during a period divided by the total number of instruments traded;

b. Time-Weighted Average Price (TWAP), which is a variant of VWAP that weights the price using the time the price spends at each level rather than the volume traded at each level;

c. Target Volume (TVOL), which is a strategy used to trade a specified percent or fraction of the actual market volume, usually at a specified relationship to the average price at which that volume trades; and d. Net Asset Value (NAV)-based trading, which permits settlement of fund share transactions and transactions in other instruments for which net asset values are periodically calculated at prices linked to a specified posting of a net asset value calculation to be made after the time of the trade.

According to embodiments of the invention, each of the above-described execution formats and processes may be characterized by settlement terms that are determined by future trading prices, future trading volumes, future NAV calculations, or some other variable or combination of variables that sets the trade's specifications and settlement provisions once the determining variables have been calculated. Such other variables will be apparent to persons skilled in the relevant arts based on the teachings contained herein. Also, other execution formats and processes applicable to the present invention will be apparent to persons skilled in the relevant arts based on the teachings contained herein.

In some embodiments, exchange transactions may utilize an arbitrary base number or proxy value, such as 100, as a centering point for either a price measured in currency or in percent. Further, additional embodiments may incorporate a root symbol with an extension or a special symbol to designate both the financial instrument and the order type.

Further, in contrast to certain informal trading instructions or trading algorithms whereby a broker attempts to provide an execution as close as possible to a specified net asset value or as close as possible to a specified average value and/or fraction of total volume, trades and transactions described herein may be anonymously executed firm contracts for settlement at a specific relationship to a specified net asset value calculation, or to specified realized average prices and/or volumes.

Trades based upon volume-weighted average pricing are the most commonly used over-the-counter transactions contingent upon future prices. However, in spite of their popularity, VWAP trades have often been criticized for their effect on markets. By coupling traditional volume-weighted average pricing with exchange trading, the present invention provides an end-of-day transparency in VWAP trading that is absent from existing trading processes.

A volume-weighted average price (VWAP) is a ratio of a total value of an item traded to total volume traded over a particular time horizon (usually one trading session or the remainder of a trading session after an order is entered), and as such, VWAP is the average price for a financial instrument over the specified time horizon with proportionately more weight given to periods of heaviest trading. In equity markets, VWAP is a common measure of the average price a stock traded at over the measurement period, and VWAP is often used as a trading cost benchmark by investors who aim to be as passive as possible in their trade executions. Many institutional investors fall into this category. The aim of using a VWAP trading target is to ensure that the broker or market maker executes the order in line with the volume and prices available in the market.

VWAP orders (and related orders described herein) may be based on the VWAP calculation for an entire trading session or for only a portion of the trading session. A common contract in the over-the-counter market may use the VWAP calculation for the portion of the trading session that remains after an agreement to buy or sell at VWAP is made. Weaknesses of currently available over-the-counter trading in these agreements include an oversimplification of remainder of session VWAP calculations, a lack of competition in pricing remainder-of-session trades, a need to renegotiate any change in an order with a specific broker or market maker, and an absence of a price or volume calculation subject to regulatory oversight.

Even if the exchange does not introduce a remainder-of-session contract, the availability of competitive quotations throughout the session for full-session contracts on the exchange will enable an investor who wants to cancel or offset the effect of the remaining transactions in a full session contract to enter into a counter-trade that largely or entirely offsets the impact of remainder of the session trades that might be executed by the counterparty to a full session trade. The full-session contract will be competitively priced throughout the session. In less formal arrangements in the over-the-counter market, an investor is dependent on the goodwill of a market maker when negotiating his way out of the remainder of a full session VWAP trade.

Order entry systems and quotation standards in financial markets typically reflect a price at which securities, commodities or other financial instruments are exchanged and the size of the position to be purchased or sold. If an item is trading for around $20.00, a bid to purchase the item might be $19.95 and an offer to sell the item might be $20.05. The quotation structure also reflects the respective quantities bid for and offered. This traditional exchange quotation and order entry structure has impeded the development of transaction mechanisms to deal with prices and quantities to be determined in the future because there is no simple correlation between current prices and volumes, and prices and volumes which may be determined by future trading or in some other manner.

Through the embodiments described herein, the needs of investors using these contingent orders are accommodated by stating transaction prices at or relative to a price or volume or price and volume that is currently unknown, but that will be determined in the future. Bids and offers (and, in some cases, trading volumes) to be determined will be stated relative to an exemplary anchor point, or proxy value. The anchor point or proxy value can be any agreed upon value, such as but not limited to 100. The present invention is not limited to this specific numerical anchor point or proxy value, but its use provides a simple mechanism by which market participants relate the present market to a price or volume to be determined in the future. One skilled in the art would recognize that a number of numerical anchor points would be suitable for use within the embodiments of the present invention.

Using the example of the above-mentioned item trading at $20.00, a price that would be close to the future price might be transacted in terms of bids at 99.95 (5 cents less than the proxy) and offers at 100.05 (5 cents greater than the proxy), representing the essence of the bid at $19.95 ($20.00 minus $0.05) and the offer at $20.05 ($20.00 plus $0.05) that was cited above. If there is a great deal of uncertainty as to the appropriate future price or an absence of active liquidity providers, the appropriate bid might be stated at 99.50 versus an offer of 100.50. These quotations would suggest a bid at $19.50 and an offer at $20.50 in an instrument trading at $20.00. In this example, a benchmark settlement price of $21.00 would call for settlement of a trade at the bid side of 99.95 at a price of $20.95. The above examples represent currency applications. Percentage applications where 99.95 and 100.05 translate into $19.99 (0.9995×$20.00) and $20.01 (1.0005×$20.00) with a benchmark settlement at $20.00 are also possible and fall within the scope of the invention, but seem less intuitive in most trading applications.

In the foregoing examples, the use of an exemplary anchor point or proxy value, such as 100, should be understood as a way to transact around the price to be determined in the future rather than absolute dollar amounts. Percentage applications may be more appropriate for transactions based on trading volume to be determined in the future. However, the present invention may employ percentage applications to describe transactions based on any combination of price and trading volume that would be apparent to one skilled in the art.

Further, while either a price reference standard or a percentage reference standard can be adopted for a given trading market, there is no necessary reason for all markets to adopt the same standard. For example, one market may use a currency-based difference and another market can use percentages of the determining price or volume. As described within the embodiments below, TVOL trades may be entered to buy or sell a specific percentage of the instruments traded on an exchange during the specified period, and VWAP trades may likewise be entered to buy or sell shares at a specific future price on the same exchange.

Symbols and Extensions for Contingent Trading of Financial Instruments

One feature of many U.S. markets is a limitation on the number and type of characters that can be accommodated in various data fields of a quotation or order entry system. In some cases, these symbology constraints are inherent in the core system; in others, they might be accommodated in the core system over time and at a manageable cost, but legacy feeder systems at customer locations would also have to be modified. It can, therefore, be useful to use a root symbol which might have, in a typical case, three or four characters and an extension consisting of additional characters which describe the nature of the instrument being traded in more detail and the basis for trading, i.e., trading at a future price or a percentage of volume during a designated period.

The root symbol of a financial instrument, such as the Standard & Poor's Depositary Receipts (SPDRs, pronounced spiders, trading symbol SPY), might be followed by a decimal point and the letters TW for VWAP trading during a full day's trading session. For time-weighted average price (TWAP) trading, the letters following the decimal for a full session average might be TW. For target volume (TVOL) trading, a future volume determined trading strategy that calls for execution of transactions based on a targeted percentage of total market volume, the extension might be TV. For net asset value (NAV) based pricing, a type of future price or value determined trading appropriate for exchange-traded funds, closed-end funds and other instruments for which a net asset value is periodically calculated, the end-of-session NAV extension might be NV. In additional embodiments, these extensions may be further modified by changing letters to distinguish between trades to be settled at the average price during the entire daily trading session, during the remainder of the trading session beginning with the next transaction after the VWAP, TWAP or TVOL contract is executed or at an NAV determined at a time other than the market close. Such conventions may accommodate a range of innovative order variations with a readily understood symbology useful to market participants.

Table 3 outlines a number of exemplary extensions that may be applied to a root symbol of a financial instrument in accordance with embodiments of the present invention. It is noted that the extensions shown in Table 3 as well as others described herein are provided solely for purposes of illustration, and not limitation. Other means for denoting contingent trading as described herein, whether involving symbols, extensions or some other approach, will be apparent to persons skilled in the art based on the teachings contained herein.

In the example of Table 3, Standard & Poor's Depository Receipts (SPDRs), rather than a common stock, are used to illustrate the application of the present invention to both NAV-based trading and order types that may be used in conjunction with any financial instrument.

TABLE 3

| Trade Type | Full Session or End of Day | Rest of Session | Hourly NAV | Cap or Floor on Price Permitted |
|---|---|---|---|---|
| VWAP | SPY.VW | SPY.WR | — | Yes |
| TWAP | SPY.TW | SPY.TR | — | Yes |
| TVOL | SPY.TV | SPY.VR | — | Yes |
| NAV | SPY.NV | N/A | SPY.NA, SPY.NB, etc. | Yes |

Table 3 outlines exemplary symbology and trading variations for various types of transactions. In a TVOL trade, for example, a VWAP price relationship or a price cap or floor can be a condition of most orders. The cap or floor can be included or optional in the other order types. Investors may expect that some orders entered with a cap or floor are both less likely to be executed and less likely to attract aggressive traders.

In the hourly NAV column, extensions .NA and .NB are used to suggest NAV calculations that might be made hourly at, say, 10:00 a.m. and 11:00 a.m., respectively, if most U.S. financial markets continue to open at 9:30 a.m. Eastern Time. Although not outlined within Table 3, additional embodiments may incorporate VWAP, TWAP and TVOL executions based on hourly or other specified periods.

In an embodiment described above with respect to Table 3, a basic, or root symbol of a security or other financial instrument has been combined with an extension to describe the nature of the execution process. In an additional embodiment, a newly specified symbol designates both the instrument and the execution type. Further, a full session VWAP trade in the SPDR may be described by a symbol such as SPY.VW, where the extension is used not only to designate the execution process, but also the settlement process. In such an embodiment, the settlement process may be described in terms of at least one of: (i) transaction size; (ii) routing codes; (iii) instructions; (iv) price; (v) order price; (vi) time-in-force; (vii) settlement type; and (viii) limit price, as outlined below.

The specifics of an exchange market order entry process are constrained by the systems in place at the exchange and on the computers of its customers. One preferred embodiment of this invention modifies some order entry conventions in use at the New York Stock Exchange (NYSE), and the embodiments described herein describe functions that might be performed with data in certain fields using NYSE terminology. The terminology and conventions will be different to varying degrees on other securities exchanges and significantly different on futures exchanges. While some unaffected fields will be described for clarity even if their use is not modified to accommodate the price- and volume-contingent orders described herein, the above description illustrates how the existing structure of exchange order entry might accommodate the types of price and volume contingent trades described herein.

(i) Size

The size field carries the number of shares or other units to be bought or sold. For most orders to trade financial instruments, including the transaction variations described herein, the size represents simply the number of shares covered by the order. With the exception of the NAV-based trades, these price- and volume-contingent orders are designed primarily for use by institutional or other large investors. Consequently, trade entry may be restricted to round lots for some order types. For example, an order for 100 shares is designated as 100, but the last two digits are always zeros for order types limited to round lots.

For TVOL trades, the order is not expressed in terms of a number of shares because the number of shares is contingent on the number of shares traded during an interval. In one embodiment, an appropriate convention would fix the size field for TVOL trades at 100, representing one percent of the day's or other relevant time period's trading volume. Traders would execute six separate orders for "100" to cover 6% of the session's volume. Alternately, the size of the field may be capped at 1,000 so that no more than 10% of the transaction volume during a designated period or session can be contracted for with a single trade. With this convention, an order for "600" in the size field covers 6% of the volume in the specified time period. Further, one skilled in the art would recognize that a number of additional techniques may be employed to accommodate the volume percentage term in a TVOL order.

(ii) Routing Codes

While routing codes are used principally to direct an order to a particular execution facility at the exchange, they might be used in contingent orders for trade designation or settlement control, either as a supplement to a special symbol or symbol extension or as a separate designator.

(iii) Instructions

In the embodiments described above, three types of instructions may be appropriate: BUY (Buy), SL (Sell) or SSHRT^EXEMPT (sell short exempt from the uptick rule). The sell short exempt instruction is used primarily for trades in exchange traded funds which are exempt from the uptick rule, but which still need to be designated as a short sale for other regulatory purposes. In trades contingent on a future price or volume, the instruction set for a securities trade cannot reasonably incorporate a traditional non-exempt short sale because the initial transaction merely engages the buy-side party to receive shares at a price or in a size (or both) to be determined. Similarly, the sell-side party contracts to deliver shares now owned or to be purchased on a timely basis to fulfill the contract. Permitting a short sale in a non-exempt security or financial instrument in this manner would provide a potential regulatory end run around the uptick rule. At such time as short sale regulations change, what are now non-exempt short sales may be permitted to use the non-exempt short sale order type.

(iv) Price

For price-contingent trades, the core basis price may be a standard set by the exchange, which, as suggested above, might be 100 in a VWAP, TWAP or NAV contingent order, with ultimate pricing in currency increments around the settlement price. In the case of TVOL trades, a reasonable way to designate the price is also in increments or decrements around a VWAP basis calculated over the same period as the TVOL. To the extent that a market participant desires to put a limit on the actual share price, the limit may be specified in the limit price field as described below.

(v) Order Type

Ordinarily, market, market-on-close, limit or other qualifications or extensions are used in stating an order. An order type not currently in use might be used alone or as a supplementary field to designate this order as a VWAP, TVOL, NAV or other trade type.

(vi) Time-in-Force

Time-in-force variations from day orders are within the scope of the present invention.

(vii) Settlement Type

The settlement default in most trades of securities in the United States is "regular way," i.e., settlement on the third day after execution. The settlement terms on the trades described herein are set when all price or volume contingencies are determined, usually shortly after the market close on the trade date, making third day settlement a reasonable choice. However, VWAP-based and NAV-based orders for "cash settlement" are expected to be common and cash settlement can be the default or an available option in some of these trades To meet processing requirements, one embodiment of the invention uses a new settlement type or types specifically for these executions or to trigger a special transaction restatement and settlement process after capture of the necessary contingent variables by the symbol, the symbol extension or a routing code. The contingent trades would be reported to the counterparties for comparison shortly after the execution, but the trades would have to be restated to incorporate contingencies. The restated trades would then settle. The contingent trades would not settle but a record of them would be retained for regulatory purposes.

(viii) Limit Price

New York Stock Exchange orders and orders on many other exchanges can have two price fields. The second price field usually states a limit such as a cap or floor. A limit is usually based on the dollar price of a share. In the case of a buy order, the limit price would be a cap by default. In the case of a sell order, the limit price would be a floor by default and the price would be the dollar price of the underlying share, not the "100" or other basis price used in the primary price field.

Systems and Methods for Trading Financial Instruments on an Exchange

Figure 9:
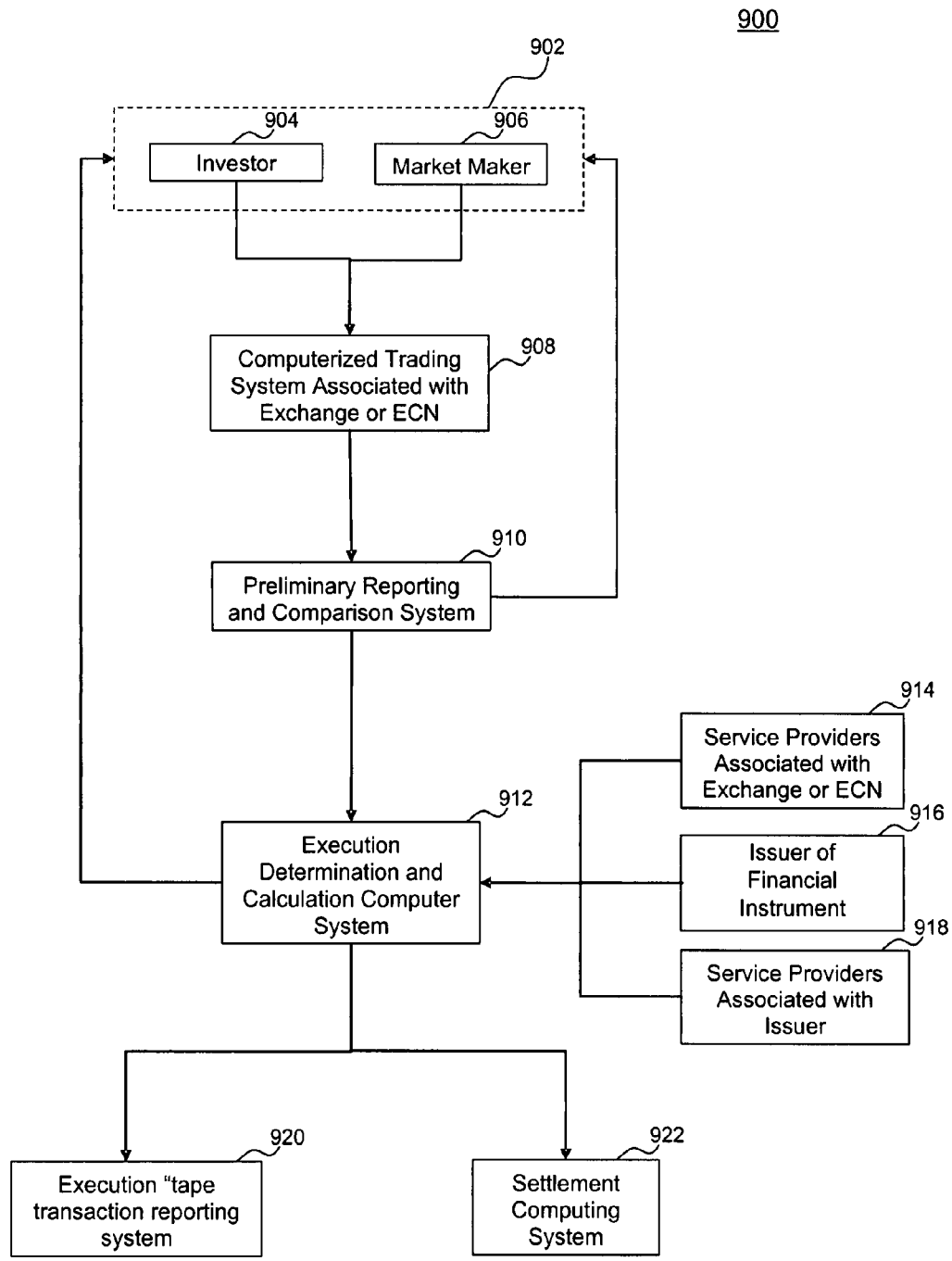
FIG. 9 is an exemplary system for trading financial instruments on an exchange or on an electronic communications network (ECN) in accordance with an embodiment of the present invention.

FIG. 9 is an exemplary system 900 for trading financial instruments on an exchange or an electronic communications network (ECN) in accordance with an embodiment of the present invention. The exemplary system 900 comprises a number of parties 902 that enter orders to trade financial instruments, such as but not limited to common stocks, mutual funds and exchange-traded funds (ETFs) on an exchange or an electronic communications network (ECN). In the embodiment of FIG. 9, the parties 902 may include an investor 904 and a market maker 906, although in additional embodiments, the parties 902 may be comprised of any number of investors, acting individually or through brokers, and market makers, depending on the nature of the market and the requirements of market participants at any given time.

The investor 904 and market maker 906 may enter orders to trade the financial instrument by electronically transmitting bids to purchase the financial instrument and offers to sell the financial instrument to a computerized trading system 908 that is associated with the exchange or ECN. The bids and offers for the financial instrument may be stated relative to a contingency based on a future price or net asset value and/or future trading volume of the financial instrument. The range of possible contingencies may include, but is not limited to, a volume-weighted average price of the financial instrument (VWAP), time-weighed average price of the financial instrument (TWAP), a target trading volume of the financial instrument as a percentage of total volume in the market during a specified period (TVOL), and net asset value (NAV) calculations of the financial instrument typically provided by fund issuers or service providers associated with the issuer of the financial instrument.

As described above in Table 3, the respective VWAP-based, TWAP-based, and TVOL-based contingencies may be calculated over a full trading session or, alternatively, over a portion of the trading session remaining after a trade is executed. NAV-based contingencies may be calculated more frequently than once per day. In additional embodiments, the VWAP-based, TWAP-based, TVOL-based, and NAV-based contingencies may be computed over any of a number of time periods that would be apparent to one skilled in the art. Further, as outlined above with respect to Table 3, an extension may be applied to a root symbol of the financial instrument to indicate any combination of a particular contingency, execution process, and settlement process.

The computerized trading system 908 then matches a bid to purchase the financial instrument with an offer to sell the financial instrument in order to execute the trade according to contractual terms set forth in the respective bid and offer. Once the trade has been executed, details of the executed trade (or transaction) may be transmitted from the computerized trading system 908 to the preliminary reporting and comparison system 910 as a report stating the terms of the transaction and any price, volume, or price and volume contingencies to which the execution is subject. The transaction is not submitted to settlement until the contingent prices, volumes and/or other terms have been determined, and depending upon the rules of the exchange, the first stage of the transaction may or may not be published on a trade reporting system.

The preliminary reporting and comparison system 910 prepares initial reports that may be sent to trading parties 902 for comparison purposes and to an execution determination and calculation computer system 912 that accepts contingency price and volume calculations (as well as other contingent calculations, depending on the embodiment) from service providers 914 that may be operated by or associated with the exchange or ECN or other regulatory authority. In the case of executed orders contingent upon NAV calculations, the execution determination and calculation computer system 912 may accept NAV calculations from issuers 916 of financial instruments for which a net asset value is periodically calculated, and their service providers 918, including calculation agents. Once all contingent terms have been received, the execution determination and calculation system 912 computes the contractual terms of the trade and reports the executed trade and the contractual terms to an exchange transaction reporting system 920, to a trade settlement system 922, and to the parties 902 to the trade, including investors 904 and market makers 906.

Figure 10:
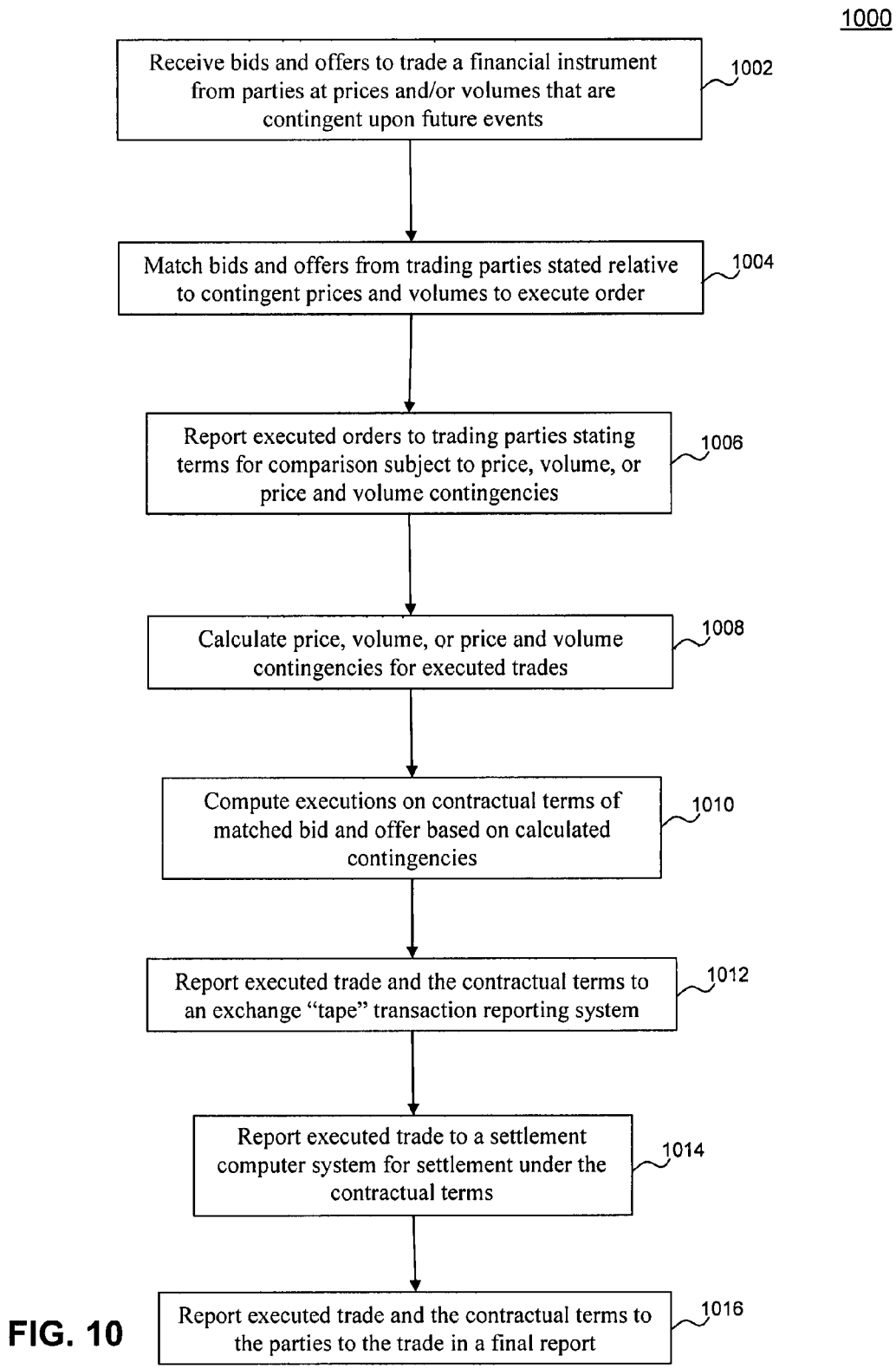
FIG. 10 is a detailed overview of an exemplary method for trading financial instruments on an exchange or ECN according to an embodiment of the present invention.

FIG. 10 is a detailed overview of an exemplary method 1000 for trading financial instruments according to an embodiment of the present invention. In step 1002, a computer trading system associated with an exchange or ECN receives at least one order to trade a financial instrument, such as but not limited to a mutual fund and an exchange-traded fund (ETF), from a potential party to the trade. Within step 1002, the parties to the trade may be investors or market makers, depending on the nature of the market and the requirements of market participants at any given time, and each party may enter an order on the exchange by transmitting the order electronically to the computerized trading system.

The order to trade the financial instrument may represent a bid to purchase the financial instrument or an offer to sell the financial instrument, and the received orders may be stated in terms of prices, trading volume, and net asset values of the financial instrument that are contingent upon future events. In one embodiment, the contingency may be based on a net asset value (NAV) of the financial instrument calculated periodically at specified time intervals throughout a trading day. For example, the NAV may be computed at 10:00 am and at 11:00 if an exchange were to open for trading at 9:30 am. In additional embodiments, the contingency may be based on a volume-weighted average price (VWAP) or a time-weighted average price (TWAP) of a financial instrument or other financial instrument calculated over a specified time interval. The contingency may also be based on trading volumes (TVOL) expressed as a percentage of the total volume of a financial instrument or other financial instrument traded during a specified time interval. The contingency may be stated in the order in terms of a proxy, as described herein.

In step 1004, once orders from the various parties to the trade have been received, the received bids and offers are stored, and the bids and offers for financial instruments from the various parties are then matched to execute an order between parties. The executed order matches a bid to purchase a particular financial instrument with an offer to sell the particular financial instrument, where both the bid and offer have been stated in terms of a compatible contingency such as but not limited to a future price, future trading volume, future net asset value of the financial instrument, etc. In some embodiments, the executed order may be reported over the exchange tape at the time of execution (i.e., during step 1004) as well as after contingency determination.

In step 1006, terms of the executed order, including any future price, future volume, or future price and future volume contingencies to which the order is subject, are reported to the trading parties. The reporting process may include transmitting a report of the transaction to the individual trading parties for review and comparison with their bid or offer. By reviewing the report, trading parties may identify errors and may initiate actions to correct any errors. In additional embodiments, the terms of the executed order may be transmitted to an external system, such as the preliminary reporting and comparison system 910 within FIG. 9, and the external system may report the terms of the executed transaction to the trading parties.

In step 1008, the contingencies upon which the order has been executed are computed. In one embodiment, the computed values of the price-based, volume-based, or NAV-based contingencies are provided to an external computer system, such as the execution determination and calculation computer system 912 within FIG. 9.

For executed orders contingent upon net asset value (NAV), contingent terms may be periodically calculated by at least one of an issuer of the financial instrument, a service provider associated with the issuer, the market, or a regulatory authority. Contingent terms based on price and trading volume, such as VWAP-based, TWAP-based, and TVOL-based contingencies, may be computed directly by the computerized trading system associated with the exchange or ECN or by service providers under the supervision of the exchange or ECN. As the contingent terms are calculated by parties independent of the trade, conflicts of interest may be substantially reduced or eliminated.

In step 1010, the contractual terms of the executed trade are computed, and the contractual terms of the executed trade are reported to the parties to the trade in a final report. In one embodiment, the contractual terms may be computed by an external computer system, such as the execution determination and calculation computer system 912 within FIG. 9.

In step 1012, the executed trade and the contractual terms associated with the executed trade will be reported to an exchange transaction reporting system, and the exchange transaction reporting system 920 will publish the executed trade. The exchange transaction reports will be supplied to one or more financial reporting services.

Further, in step 1014, the executed trade will be reported to a settlement computer system for settlement under the computed, contractual terms. In an embodiment, the settlement computer system is associated with the National Securities Clearing Corporation (NSCC), a wholly owned subsidiary of The Depository Trust & Clearing Corporation (DTCC). The NSCC provides centralized clearance, settlement and information services for virtually all broker-to-broker equity, corporate bond and municipal bond, and exchange-traded funds trades in the United States.

In step 1016, the executed trade and the contractual terms associated with the executed trade may then be confirmed to the parties to the trade.

Figure 11:
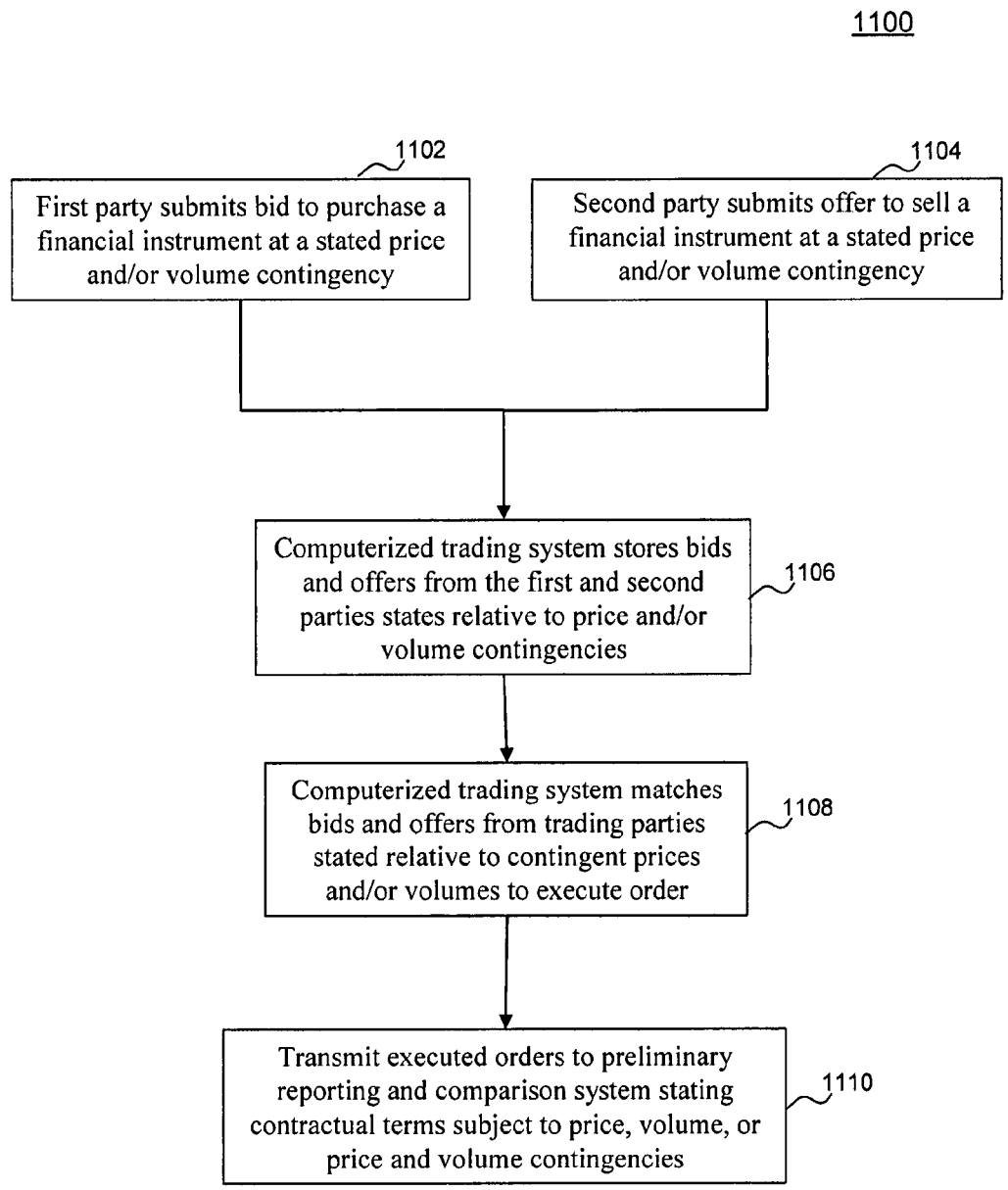
FIG. 11 is a detailed illustration of a method for executing an order for a financial instrument that may be used with the exemplary method of FIG. 10.

FIG. 11 is a detailed illustration of a method for executing an order for a financial instrument that may be incorporated into step 1002 of the exemplary method of FIG. 10. In step 1102, a first party enters an order to buy (or sell) at least one share of a financial instrument, such as but not limited to a mutual fund and an exchange-traded fund (ETF), on an exchange or ECN that trades the financial instrument. The bid (or offer) entered by the first party within step 1102 may be stated relative to a future value of a first contingency using a proxy value.

In step 1104, a second party enters an order to sell (or buy) at least one share of the financial instrument, such as an exchange-traded fund (ETF), on the exchange or ECN. As described in reference to step 1102, the offer (or bid) entered by the second party within step 1102 may be stated relative to a future value of the same contingency using a proxy value.

In one embodiment, the first party of step 1102 may be an investor acting through a broker and the second party of step 1104 may be a market maker. However, in additional embodiments, the first and second parties may be any combination of investors or market makers or other market participants, depending on the nature of the market and the requirements of market participants at any given time. Further, during steps 1102 and 1104, the first and second parties enter orders by transmitting the orders electronically to a computerized trading system.

The contingency of interest to the parties 1102 and 1104 may be a net asset value (NAV), a time-weighted average price (TWAP) or a volume-weighted average price (VWAP) calculated over a specified time interval. The contingency may be also based on a target volume expressed a percentage of total trading volume of the financial instrument on the market during a specified time period (TVOL).

Once the orders from the first and second parties have been entered into the computerized trading system in steps 1102 and 1104, respectively, the computerized trading system then accepts and stores the orders in step 1106. The computerized trading system stores not only the order for the financial instrument, but also any contingency upon which the order is stated. In additional embodiments, steps 1102, 1104, and 1106 may be repeated for additional parties that enter orders for the financial instrument stated in terms of price-based, volume-based, and/or NAV-based contingencies.

In step 1108, the computerized trading system matches the order for the financial instrument from the first party to a corresponding order for the financial instrument from the second or some other party. In addition to matching bids and offers for the financial instruments entered by the first and second parties, the processes within step 1108 also determine whether the contingent terms of the orders are compatible. If the computerized trading system successfully matches the bids and offers from two parties, then the order is executed in step 1110 subject to the stated contingencies on price (including NAV), trading volume, or price and trading volume of the financial instrument. The executed orders will be reported to the applicable parties as described above with reference to FIG. 10.

Figure 12:
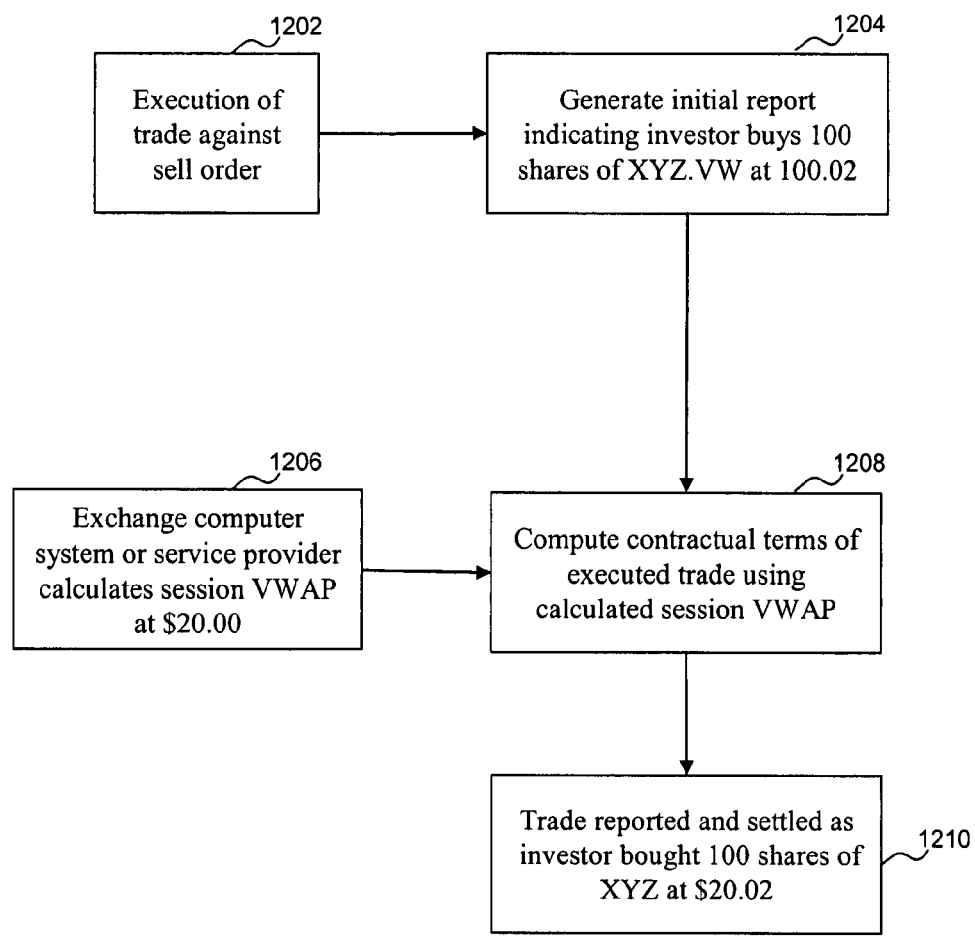
FIG. 12 illustrates an exemplary transaction in which an investor purchases a financial instrument subject to a price-based contingency in accordance with an embodiment of the present invention.

FIG. 12 illustrates an exemplary transaction 1200 in which an investor purchases a financial instrument that is subject to a price contingency in accordance with embodiments of the present invention. In step 1202, an investor enters a bid to purchase 100 shares of financial instrument XYZ.VW at 100.02 (or better) into a computerized trading system associated with an exchange or ECN on which XYZ.VW is traded. Purchasing shares of XYZ.VW at 100.02 or better indicates that the investor will purchase the shares for no more than two cents ($0.02) above a VWAP calculated for the trading session. The computerized trading system matches the investor's bid with a corresponding sell order that has been stored by the computerized trading system, and the trade for 100 shares of XYZ.VW is executed subject to the stated VWAP contingency during step 1202.

An initial report is generated in step 1204 indicating that the investor has purchased 100 shares of XYZ.VW at 100.02 and, after it is inspected by the investor as part of the comparison process, information on the trade is transmitted to the execution determination and calculation computer system 912 within FIG. 9. The executed trade is stored by the execution reporting mechanism pending arrival of information on the contingent price on which settlement is based.

In step 1206, the exchange computer system or a service provider engaged by the exchange calculates a VWAP for the financial instrument XYZ.VW at the completion of the trading session (a session VWAP). In the example of FIG. 12, the session VWAP of XYZ.VW may be calculated as $20.00. The session VWAP is then used in step 1208 to compute the contractual terms of the executed trade, and using the example of FIG. 12, an execution of a trade at 100.02 on a $20.00 VWAP results in a buy price of $20.02. The investor has purchased 100 shares of XYZ.VW at a share price of $20.02. This information is then reported on the exchange "tape" reporting mechanism and sent to settlement during step 1210. Using the symbology outlined above, the executed trade may be confirmed as "Bot 100 shares of XYZ @$20.02."

Figure 13:
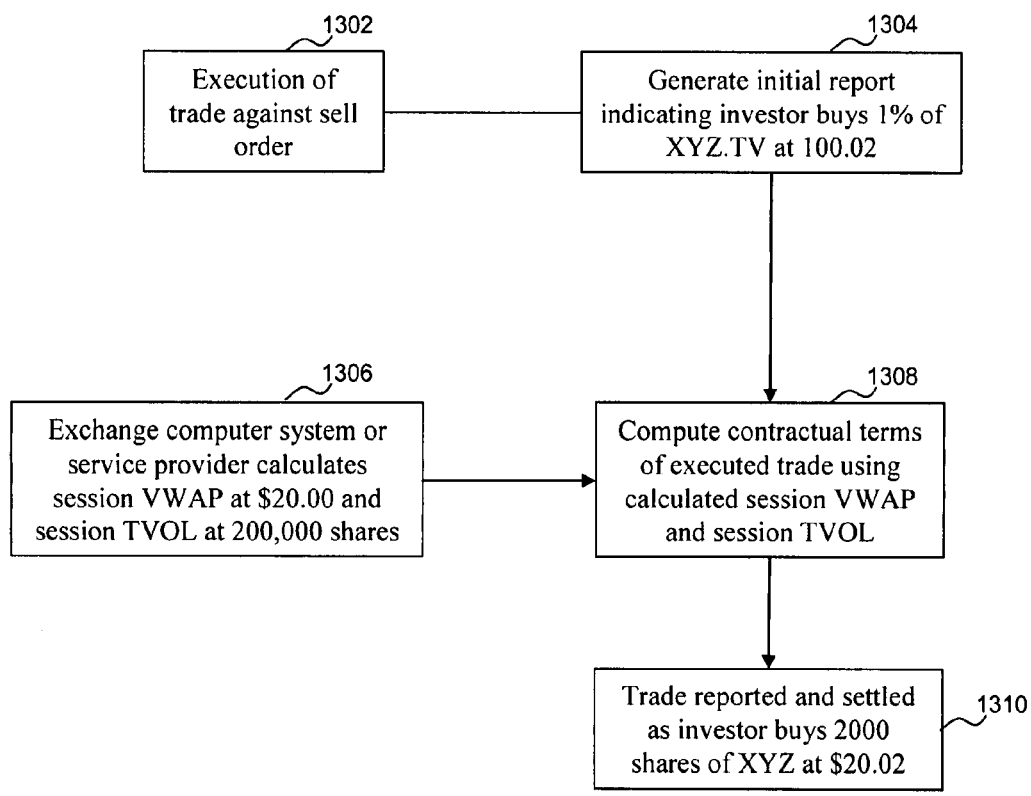
FIG. 13 illustrates an exemplary transaction in which an investor purchases a financial instrument subject to a volume-based contingency in accordance with an embodiment of the present invention.

FIG. 13 illustrates an exemplary transaction 1300 in which an investor purchases a financial instrument that is subject to a volume-based (TVOL) contingency in accordance with embodiments of the present invention. In step 1302, an investor enters a bid to purchase 1% of the session trading volume in XYZ at 100.02 or better (at no more than $0.02 over the volume-weighted average price (VWAP) for that session) into a computerized trading system. The computerized trading system matches the investor's bid with a corresponding sell order that has been stored by the computerized trading system, and the trade for 100 shares of XYZ.VW is executed subject to the stated price and volume contingency.

An initial report is generated in step 1304 indicating that the investor has purchased 1% of the session trading volume in XYZ at 100.02 (i.e., "Bot 1% of XYZ.TV at 100.02") and, after it is inspected by the investor as part of the comparison process, information on the trade is transmitted to the execution determination and calculation computer system 912 within FIG. 9. The executed trade is stored by the execution reporting mechanism pending arrival of information on the contingent price and volume on which settlement is based.

In step 1306, the exchange computer system or a service provider engaged by the exchange computes a session VWAP at $20.00 and a session TVOL at 200,000 shares. In the example of FIG. 13, 1% of 200,000 shares is equivalent to 2,000 shares and an execution at 100.02 on a $20.00 VWAP is a price of $20.02. The session VWAP and TVOL are used in step 1308 to compute the contractual terms of the executed trade, and using the example of FIG. 13, the investor has purchased 2,000 shares of XYZ.TV at a share price of $20.02. This information is then reported on the exchange "tape" reporting mechanism and sent to settlement during step 1310, and using the symbology outlined above, the investor's report may read "Bot 2000 shares of XYZ at $20.02."

In contrast to informal volume-linked orders placed with brokers today, the executed trade described within FIG. 13 requires a locked-in commitment to purchase the financial instruments based on the specified volume-based contingency, and this commitment occurs when the trade is executed in step 1302. Both parties are bound to the settlement price and, in this case, volume of the order that will be determined as soon as the contingent price and volume are known.

Figure 14:
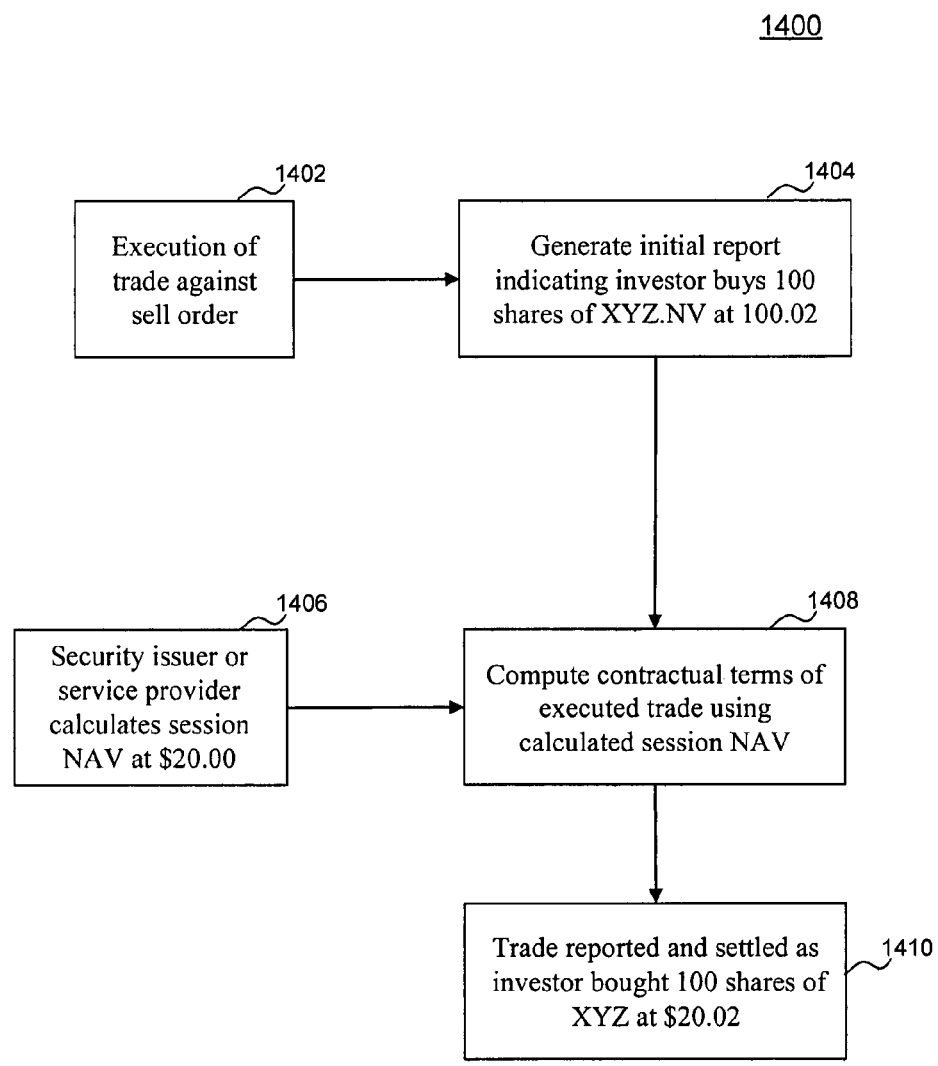
FIG. 14 illustrates an exemplary transaction in which an investor purchases a financial instrument subject to a net asset value-based contingency in accordance with an embodiment of the present invention.

FIG. 14 illustrates an exemplary transaction 1400 in which an investor purchases a financial instrument that is subject to a net asset value-based contingency in accordance with embodiments of the present invention. In step 1402, an investor enters a bid to purchase 100 shares of XYZ.NV at 100.02 (or better) into a computerized trading system on which XYZ.NV is traded. The order indicates that the investor will purchase the shares for no more than two cents ($0.02) above the net asset value (NAV) calculated at the end of the trading session. The computerized trading system matches the investor's bid with a corresponding sell order that has been stored by the computerized trading system, and the trade for 100 shares of XYZ.NV is executed subject to the stated NAV-based contingency within step 1402.

An initial report is generated in step 1404 indicating that the investor has purchased 100 shares of XYZ.NV at 100.02 and, after it is inspected by the investor as part of the comparison process, information on the trade is transmitted to the execution determination and calculation computer system 912 within FIG. 9. The executed trade is stored by the execution reporting mechanism pending arrival of information on the contingent price on which settlement is based.

In step 1406, the issuer of the financial instrument or a calculation agent engaged by the issuer calculates an NAV for the financial instrument designated by XYZ.NV at the completion of the trading session. In the example of FIG. 14, the end of day NAV for XYZ.NV may be calculated as $20.00. This value is used in step 1408 to compute the contractual terms of the executed trade, and using the example of FIG. 14, an execution of a trade at 100.02 on a $20.00 NAV results in a share price of $20.02. The investor has purchased 100 shares of XYZ.NV at a share price of $20.02. This information is then reported on the exchange "tape" reporting mechanism and sent to settlement in step 1410. The trade is reported to the investor as "Bot 100 shares of XYZ @$20.02."

The example of FIG. 14 describes a transaction for XYZ.NV that involves a contingency based on an end of day NAV. As described above in reference to Table 3, the NAV-based contingency is not limited to end of day NAVs, but may also incorporate NAVs computed periodically during a trading session. In such a case, the example of FIG. 14 would be modified such that the investor would purchase shares of XYZ.NA or XYZ.NB, orders of which would be contingent upon NAV values computed at various times during the trading session.

The foregoing embodiments describe exemplary systems, methods, and computer program products for trading financial instruments on an exchange or an electronic communications network (ECN). Within such embodiments, the financial instruments may include, but are not limited to securities, mutual funds, exchange-traded funds, open-end funds, closed-end funds, stocks, swaps, futures, and other derivatives, either alone or in combination. Further, the embodiments described herein may accommodate any additional financial instrument that would be apparent to one skilled in the art and that may be traded on an exchange or ECN.

The embodiments described herein preserve the anonymity of trading parties and the confidentiality of their trading plans. Informal or direct party-to-party negotiation of contracts with price or volume contingencies in over-the-counter markets often reveals information that a trading party might prefer to keep confidential. For example, direct negotiations with a market maker are characteristic of most non-exchange future price or future volume-contingent trade entry. Such negotiations generally require the customer to reveal its identity to the broker or market maker at some point in the negotiation process. In contrast, with the present invention, if the parties use standard order formats and procedures characteristic of exchange trading, there is no need for a market maker or any participant in the transaction to know the identity of the ultimate parties to the trade. One advantage of concealing a trader's identity is that an exchange-based transaction need provide no information about the total size of the market participant's trading intention. Confidentiality in a very high degree can be assured by incorporating novel features into exchange systems such as the New York Stock Exchange's (NYSE) Anonymous SuperDOT (ADOT) order entry system.

Further, the trades described herein may be used as part of a block trading program. For example, a seller of a block of stock might find a buyer using any of the trading techniques and order types described herein. By executing an order with that buyer early in the block sale process, the seller might reduce the market impact of the sale by finding a natural buyer who might not be easy to find directly in the typical block trading process. This interaction may reduce transaction risks and costs for either or both parties to the trade.

Exemplary Computer Interfaces for Trading Financial Instruments on an Exchange

FIGS. 15A and 15B illustrate an exemplary computer graphical user interface (GUI) 1500 through which an order for a financial instrument may be entered on an exchange according to embodiments of the present invention. The example of FIGS. 15A and 15B is provided solely for purposes of illustration, and not limitation. Other means for entering an order for a financial instrument will be apparent to persons skilled in the relevant arts, and such other means are within the scope and spirit of the present invention.

In FIGS. 15A and 15B, the exemplary computer interface 1500 may directly communicate with a computerized trading system associated with the exchange or ECN, and computer interface 1500 allows a party to a trade, such as an investor, to enter information regarding a specific bid to purchase a financial instrument or a specific offer to sell a financial instrument on the exchange or ECN. The financial instruments may include, but are not limited to securities, mutual funds, exchange-traded funds, open-end funds, closed-end funds, stocks, swaps, futures, and other derivatives, either alone or in combination. Further, the embodiments described herein may accommodate any additional financial instrument that would be apparent to one skilled in the art and that may be traded on an exchange or ECN.

In the example of FIGS. 15A and 15B, the investor first specifies a particular financial instrument that will be subject to the bid or offer entered through the computer interface. In FIG. 15A, the investor enters the root symbol of the particular financial instrument in field 1502, and the entered root symbol should correspond to the ticker symbol of the financial instrument. For example, to trade the Standard & Poor's Depositary Receipts (SPDR), the investor would enter SPY in field 1502. In many embodiments, an extension would be entered in the same field as the root symbol, but some additional embodiments might require the investor to enter an extension in field 1504 to indicate a specific price-based, volume-based, or NAV-based contingency (or some other contingency or combination of contingencies) under which the order will be executed by the computerized trading system. For example, the investor may specify VW in field 1504 to enter an order for the financial instrument that is contingent upon a volume-weighted average price (VWAP) of the financial instrument computed at the end of a trading session. In a similar fashion, the investor may enter TW to enter an order for the financial instrument that is contingent upon a time-weighted average price (TWAP) of the financial instrument computed for the trading session. Further, TV may be entered into field 1504 to indicate an order for a specific percentage of the trading volume (TVOL) of the financial instrument over a specific time period. For an NAV-based contingency, the investor may enter NV within field 1504 to indicate that an order for the financial instrument that is contingent upon a session NAV, or alternatively, the investor may enter NA or NB to indicate that the order is contingent upon a specific hourly NAV.

The investor or the investor's agent will then specify an instruction in field 1506 to indicate the nature of the particular trade. For example, the investor enters "BUY" in field 1506 to enter a bid to purchase the financial instrument. In a similar fashion, the investor could enter "SL" in field 1506 to enter an offer to sell the financial instrument. Further, the investor may also enter "SSHRT^EXEMPT" within field 1506 to indicate that the order is exempt from the uptick rule, but must be designated as a short sale for other regulatory purposes.

The investor or the investor's agent will also specify a size of the order to be entered onto the computerized trading system in field 1508. In the case of a VWAP-contingent, TWAP-contingent, or NAV-contingent order for the financial instrument, the investor will enter the number of shares to be transacted within field 1508. In the case of a TVOL-contingent order, field 1508 may be filled with a percentage of the trading volume that will be subject to the entered order.

A share price associated with the order for the financial instrument may then be specified within field 1510. For price-contingent trades, the core basis price may be a standard set by the exchange that, as suggested above, might be a proxy value of 100 in a VWAP, TWAP or NAV contingent order, with ultimate pricing in currency increments around the settlement price. In the case of TVOL trades, a reasonable way to designate the price is also in increments or decrements around a VWAP basis calculated over the same period as the TVOL.

Once the share price has been specified within the exemplary computer interface, the investor may specify a limit price for the order in field 1512. The limit may be based on the dollar price of a share. In the case of a buy order, the limit price would be a cap by default. In the case of a sell order, the limit price would be a floor by default and the price would be the dollar price of the underlying share, not the "100" or other basis price used in the primary price field.

Once the information related to the order for the financial instrument has been entered in fields 1502 through 1512, the investor may submit the order to the computerized trading system by selecting the "SUBMIT" button 1514. Once submitted, the order is transmitted to the computerized trading system, which attempts to match and to execute the order according to the exemplary methods described herein.

FIG. 15B illustrates an exemplary set of entries into data fields of a computerized interface 1500 that would enable an investor to enter an order to purchase 1000 shares of SPY.VW at 100.05 on an exchange that trades SPY. VW. In FIG. 15B, the SPY.VW financial instrument is used for exemplary purposes only, and the computer interface 1500 supports any number of financial instruments that may be traded upon the exchange or ECN associated with the computerized trading system. Assuming that a session VWAP for SPY.VW is computed at $130.00, the entered order enables the investor to purchase 1000 shares of SPY.VW at a price of $130.05 per share, as the share price is below the specified limit price of $131.00.

In one embodiment, the computer interface 1500 within FIGS. 15A and 15B may be executed on a remote computer system that communicates with the computerized trading system through a communications path, such as a wired or wireless internet connection. In an additional embodiment, the computer interface is executed locally by the computerized trading system, and an investor on a remote computer system must access the computerized trading system to utilize the computer interface. Further, in the embodiments described above, the data within fields 1502 through 1512 may be entered directly by the investor, selected from a menu, or entered through any means that would be apparent to persons skilled in the art.

Exemplary Computer Systems

Figure 16:
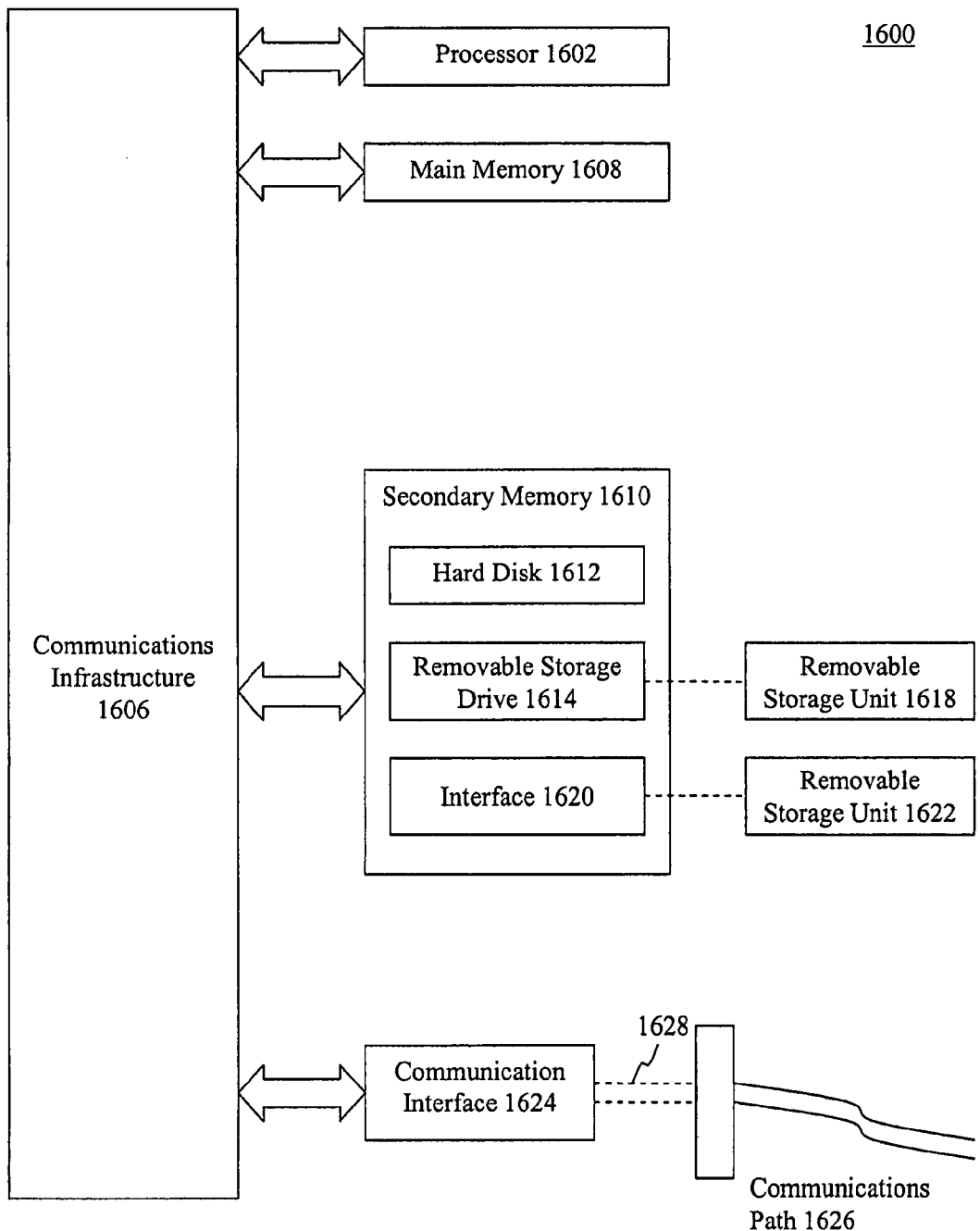
FIG. 16 is a block diagram of an exemplary computer connected to a network upon which the exemplary methods and systems of the present invention may be implemented.

FIG. 16 is a diagram of an exemplary computer system 1600 upon which embodiments of the present invention (or components thereof) may be implemented. The exemplary computer system 1600 includes one or more processors, such as processor 1602. The processor 1602 is connected to a communication infrastructure 1606, such as a bus or network. Various software implementations are described in terms of this exemplary computer system. After reading this description, it will become apparent to a person skilled in the relevant art how to implement the invention using other computer systems and/or computer architectures.

Computer system 1600 also includes a main memory 1608, preferably random access memory (RAM), and may include a secondary memory 1610. The secondary memory 1610 may include, for example, a hard disk drive 1612 and/or a removable storage drive 1614, representing a magnetic tape drive, an optical disk drive, etc. The removable storage drive 1614 reads from and/or writes to a removable storage unit 1618 in a well-known manner. Removable storage unit 1618 represents a magnetic tape, optical disk, or other storage medium that is read by and written to by removable storage drive 1614. As will be appreciated, the removable storage unit 1618 can include a computer usable storage medium having stored therein computer software and/or data.

In alternative implementations, secondary memory 1610 may include other means for allowing computer programs or other instructions to be loaded into computer system 1600. Such means may include, for example, a removable storage unit 1622 and an interface 1620. An example of such means may include a removable memory chip (such as an EPROM, or PROM) and associated socket, or other removable storage units 1622 and interfaces 1620, such as a memory stick or memory card, which allow software and data to be transferred from the removable storage unit 1622 to computer system 1600.

Computer system 1600 may also include one or more communications interfaces, such as communications interface 1624. Communications interface 1624 allows software and data to be transferred between computer system 1600 and external devices. Examples of communications interface 1624 may include a modem, a network interface (such as an Ethernet card), a communications port, a WIFI interface, a Bluetooth interface, a cellular interface, a PCMCIA slot and card, etc. Software and data transferred via communications interface 1624 are in the form of signals 1628, which may be electronic, electromagnetic, optical or other signals capable of being received by communications interface 1624. These signals 1628 are provided to communications interface 1624 via a communications path (i.e., channel) 1626. This channel 1626 carries signals 1628 and may be implemented using wire or cable, fiber optics, a wireless link and other communications channels. In an embodiment of the invention, signals 1628 comprise carrier waves modulated with control logic.

Any apparatus or manufacture comprising a computer useable or readable medium having control logic (software) stored therein is referred to herein as a computer program product or program storage device. This includes, but is not limited to, the computer 1600, the main memory 1608, the hard disk 1612, the removable storage units 1618, 1622 and the carrier waves modulated with control logic 1628. Such computer program products, having control logic stored therein that, when executed by one or more data processing devices, cause such data processing devices to operate as described herein, represent embodiments of the invention.

CONCLUSION

Embodiments of the present invention are directed to trading securities and other financial instruments at prices and in volumes contingent upon subsequent events. The subsequent events may include a determination of the net asset value of a financial instrument for which net asset values are periodically calculated or the volume-weighted, a time-weighted average price of a financial instrument calculated over a specified interval, and transactions in volumes determined as a percentage of the total volume of a financial instrument traded during a specified period.

Embodiments of the present invention also provide a variety of order types within the framework of a contingent price or volume determination. One such order type variation is a limit order where a cap or floor on the contingent price or volume is stated as part of the order entry process. Further, embodiments of the present invention include systems and methods that use the basic trading symbol of a financial instrument or other financial instrument and an extension describing the nature of the execution process. Alternatively, a newly specified symbol could designate both the instrument and the execution process.

Within the embodiments described herein, the financial instruments may include, but are not limited to securities, mutual funds, exchange-traded funds, open-end funds, closed-end funds, stocks, swaps, futures, and other derivatives, either alone or in combination. Further, the embodiments described herein may accommodate any additional financial instrument that would be apparent to one skilled in the art and that may be traded on an exchange or ECN.

It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the figures, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer-based method for trading an exchange-listed financial instrument for which a net asset value can be calculated on or away from an exchange, the method comprising;

executing a trade of an exchange-listed financial instrument for which a net asset value can be calculated priced relative to a net asset value to be calculated and published at or after a specified time;

determining a price of said executed trade, wherein said determined price is from a set of prices that are specified relative to said net asset value, said set of prices comprising (a) a first price that is at a specified discount to said net asset value; (b) a second price that is equal to said net asset value; and (c) a third price that is at a specified premium to said net asset value; and submitting said executed trade for settlement at said determined price, wherein said executing, determining, and submitting steps are executed by one or more processors.

2. The method of claim 1, wherein said executing step further comprises:

receiving an order to buy or sell said exchange-listed financial instrument priced relative to said net asset value to be calculated and published at or after said specified time; and matching said received order with a complementary sell or buy order to trade said exchange-listed financial instrument relative to said net asset value calculation.

3. The method of claim 2, wherein a format of said order to trade said exchange-listed financial instrument comprises at least one of (i) a root trading symbol for said exchange-listed financial instrument with an extension designating said net asset value calculation and (ii) a trading symbol for said exchange-listed financial instrument designating both said exchange-listed financial instrument and said net asset value calculation.

4. The method of claim 2, wherein said executing step accommodates bids or offers describing a number of shares of said exchange-listed financial instrument and at market or at a limit price.

5. The method of claim 1, further comprising at least one of computing said net asset value at or after said specified time, receiving said net asset value at or after said specified time, and delivering said net asset value at or after said specified time.

6. The method of claim 1, wherein said net asset value is computed from a session opening transaction in each position in a portfolio of an investment fund.

7. The method of claim 1, wherein an arbitrary proxy for said net asset value serves as an anchor point for said determined price to be translated into currency terms after said net asset value is calculated.

8. The method of claim 7, wherein said arbitrary proxy anchor point is set at a specific number, wherein a trade made at said specific number will be priced at said net asset value and a trade made at a price above said anchor point or below said anchor point is used to determine at least one of: (i) a price at a similar difference above or below said net asset value with said difference measured in currency and (ii) a percentage difference above or below said net asset value with said difference measured in currency to a precision determined by rules of an exchange.

9. The method of claim 1, further comprising at least one of reporting and delivering information on said executed trade to at least one of (i) a party to said executed trade, (ii) a market data reporting system, (iii) a broker or dealer, (iv) an industry utility, (v) a market data vendor, (vi) an industry service organization, (vii) a market participant, and (viii) financial media.

10. The method of claim 1, further comprising receiving information on said executed trade from at least one of (i) a party to said executed trade, (ii) a market data reporting system, (iii) a broker or dealer, (iv) an industry utility, (v) a market data vendor, (vi) an industry service organization, (vii) a market participant, and (viii) financial media.

11. The method of claim 1, further comprising retroactively modifying terms of said executed trade upon correction of an error.

12. The method of claim 1, wherein said specified time is at or relative to a closing time for an exchange.

13. The method of claim 1, wherein said exchange-listed financial instrument is at least one of (i) a share of a general class of shares of an investment fund, (ii) a share of a specialized share class of said investment fund, (iii) a fractional share of a general class of shares of an investment fund or a specialized share class of said investment fund, and (iv) a unit of an exchange-traded note.

14. The method of claim 1, further comprising at least one of (i) entering a buy or sell order to trade said exchange-listed financial instrument on a graphical user interface, (ii) displaying a buy or sell order to trade said exchange-listed financial instrument on a graphical user interface, and (iii) displaying a buy or sell order to trade said exchange-listed financial instrument on a computer display.

15. A computer-based system for trading an exchange-listed financial instrument for which a net asset value can be calculated on or away from an exchange, the system comprising:
  a module configured to execute a trade of an exchange-listed financial instrument for which a net asset value can be calculated priced relative to a net asset value to be calculated and published at or after a specified time;
  a module configured to determine a price for said executed trade, wherein said determined price is from a set of prices that are specified relative to said net asset value, said set of prices comprising (a) a first price that is at a specified discount to said net asset value; (b) a second price that is equal to said net asset value; and (c) a third price that is at a specified premium to said net asset value;
  a module configured to submit said executed trade for settlement at said determined price; and
  one or more processors, executing said modules.

16. The system of claim 15, wherein said module configured to execute further comprises:
  a module configured to receive an order to buy or sell said exchange-listed financial instrument priced relative to a net asset value to be calculated and published at or after a specified time; and
  a module configured to match said received order with a complementary sell or buy order to trade said exchange-listed financial instrument relative to said net asset value calculation.

17. The system of claim 16, wherein a format of said order to trade said exchange-listed financial instrument comprises at least one of (i) a root trading symbol for said exchange-listed financial instrument with an extension designating said net asset value calculation and (ii) a trading symbol for said exchange-listed financial instrument designating both said exchange-listed financial instrument and said net asset value calculation.

18. The system of claim 16, wherein said module configured to execute accommodates bids or offers describing a number of shares of said exchange-listed financial instrument and at market or at a limit price.

19. The system of claim 15, further comprising at least one of: (i) a module configured to compute said net asset value at or after said specified time, (ii) a module configured to receive said net asset value at or after said specified time, and (iii) a module configured to deliver said net asset value at or after said specified time.

20. The system of claim 15, wherein said module configured to execute said trade uses a net asset value calculated from a session opening transaction in each position in a portfolio of an investment fund.

21. The system of claim 15, wherein an arbitrary proxy for said net asset value serves as an anchor point for said determined price to be translated into currency terms after said net asset value is calculated.

22. The system of claim 21, wherein said arbitrary proxy anchor point is set at a specific number, wherein a trade made at said specific number will be priced at said net asset value and a trade made at a price above said anchor point or below said anchor point is used to determine at least one of (i) a price at a similar difference above or below said net asset value with said difference measured in currency and (ii) a percentage difference above or below said net asset value with said difference measured in currency to a precision determined by rules of an exchange.

23. The system of claim 15, further comprising at least one of a module configured to report and a module configured to deliver information on said executed trade to at least one of (i) a party to said executed trade, (ii) a market data reporting system, (iii) a broker or dealer, (iv) an industry utility, (v) a market data vendor, (vi) an industry service organization, (vii) a market participant, and (viii) financial media.

24. The system of claim 15, further comprising a module configured to receive information on said executed trade from at least one of (i) a party to said executed trade, (ii) a market data reporting system, (iii) a broker or dealer, (iv) an industry utility, (v) a market data vendor, (vi) an industry service organization, (vii) a market participant, and (viii) financial media.

25. The system of claim 15, further comprising a module configured to retroactively modify terms of said executed trade upon correction of an error.

26. The system of claim 15, wherein said specified time is at or relative to a closing time for said exchange.

27. The system of claim 15, wherein said exchange-listed financial instrument is at least one of (i) a share of a general class of shares of an investment fund, (ii) a share of a specialized share class of said investment fund, (iii) a fractional share of a general class of shares of an investment fund or a specialized share class of said investment fund and (iv) a unit of an exchange traded note.

28. The system of claim 15, further comprising at least one of (i) a module configured to enter a buy or sell order to trade said exchange-listed financial instrument on a graphical user interface, (ii) a module configured to display a buy or sell order to trade said exchange-listed financial instrument on a graphical user interface, and (iii) a module configured to display a buy or sell order to trade said exchange-listed financial instrument graphically on a computer display.

29. A computer program product comprising a computer useable medium having computer program logic recorded thereon for enabling a processor to trade an exchange-listed financial instrument for which a net asset value can be calculated on or away from an exchange, the computer program logic comprising:
  first computer readable program code module to enable a processor to execute a trade of an exchange-listed financial instrument for which a net asset value can be calculated priced relative to a net asset value to be calculated and published at or after a specified time;

second computer readable program code module to enable a processor to determine a price for said executed trade, wherein said determined price is from a set of prices that are specified relative to said net asset value, said set of prices comprising (a) a first price that is at a specified discount to said net asset value; (b) a second price that is equal to said net asset value; and (c) a third price that is at a specified premium to said net asset value, and third computer readable program code module to enable a processor to submit said executed trade for settlement at said determined price.

30. The computer program product of claim 29, wherein said first computer readable program code module further comprises:

fourth computer readable program code module to enable a processor to receive an order to buy or sell said exchange-listed financial instrument priced relative to a net asset value to be calculated and published at or after a specified time; and fifth computer readable program code module to enable a processor to match said received order with a complementary sell or buy order to trade said exchange-listed financial instrument relative to said net asset value calculation.

31. The computer program product of claim 30, wherein a format of said order to trade said exchange-listed financial instrument comprises at least one of (i) a root trading symbol for said exchange-listed financial instrument with an extension designating said net asset value calculation and (ii) a trading symbol for said exchange-listed financial instrument designating both said exchange-listed financial instrument and said net asset value calculation.

32. The computer program product of claim 30, wherein said first computer readable program code module enables a processor to accommodate bids or offers describing a number of shares of said exchange-listed financial instrument and at market or at a limit price.

33. The computer program product of claim 29, further comprising at least one of: (i) fourth computer readable program code module to enable a processor to compute said net asset value at or after said specified time, (ii) fifth computer readable program code module to enable a processor to receive said net asset value at or after said specified time, and (iii) sixth computer readable program code module to enable a processor to deliver said net asset value at or after said specified time.

34. The computer program product of claim 29, wherein said fourth computer readable program code module enables a processor to compute said net asset value from a session opening transaction in each position in a portfolio of an investment fund.

35. The computer program product of claim 29, wherein an arbitrary proxy for said net asset value serves as an anchor point for said determined price to be translated into currency terms after said net asset value is calculated.

36. The computer program product of claim 35, wherein said arbitrary proxy anchor point is set at a specific number wherein a trade made at said specific number will be priced at said net asset value and a trade made at a price above said anchor point or below said anchor point is used to determine at least one of (i) a price at a similar difference above or below said net asset value with said difference measured in currency and (ii) a percentage difference above or below said net asset value with said difference measured in currency to a precision determined by rules of an exchange.

37. The computer program product of claim 29, further comprising at least one of fourth computer readable program code module to enable a processor to report and fifth computer readable program code module to enable a processor to deliver information on said executed trade to at least one of (i) a party to said executed trade, (ii) a market data reporting system, (iii) a broker or dealer, (iv) an industry utility, (v) a market data vendor, (vi) an industry service organization, (vii) a market participant, and (viii) financial media.

38. The computer program product of claim 29, further comprising fourth computer readable program code module to enable a processor to receive information from said executed trade from at least one of (i) a party to said executed trade, (ii) a market data reporting system, (iii) a broker or dealer, (iv) an industry utility, (v) a market data vendor, (vi) an industry service organization, (vii) a market participant, and (viii) financial media.

39. The computer program product of claim 29, further comprising fourth computer readable program code module to enable a processor to retroactively modify terms of said executed trade upon correction of an error.

40. The computer program product of claim 29, wherein said specified time is at or relative to a closing time for an exchange.

41. The computer program product of claim 29, wherein said exchange-listed financial instrument is at least one of (i) a share of a general class of shares of an investment fund, (ii) a share of a specialized share class of said investment fund, (iii) a fractional share of a general class of shares of an investment fund or a specialized share class of said investment fund, and a unit of an exchange-traded note.

42. The computer program product of claim 29, further comprising at least one of (i) fourth computer readable program code module to enable a processor to enter a buy or sell order to trade said exchange-listed financial instrument on a graphical user interface, (ii) fifth computer readable program code module to enable a processor to display a buy or sell order to trade said exchange-listed financial instrument on a graphical user interface, and (iii) sixth computer readable program code module to enable a processor to display a buy or sell order to trade said exchange-listed financial instrument graphically on a computer display.

43. A computer-based method for trading an exchange-listed financial instrument for which a net asset value can be calculated on or away from an exchange, the method comprising:

delivering at least one order to trade an exchange-listed financial instrument for which a net asset value can be calculated priced relative to a net asset value to be calculated and published at or after a specified time; and receiving information on terms of an executed trade for said exchange-listed financial instrument, wherein a price of said executed trade is determined from a set of prices that are specified relative to said net asset value, said set of prices comprising (a) a first price that is at a specified discount to said net asset value; (b) a second price that is equal to said net asset value; and (c) a third price that is at a specified premium to said net asset value; and wherein said delivering and receiving steps are executed by one or more processors.

44. The method of claim 43, wherein a format of said order to trade said exchange-listed financial instrument comprises at least one of (i) a root trading symbol for said financial instrument with an extension designating said net asset value calculation and (ii) a specified trading symbol designating both said exchange-listed financial instrument and said net asset value calculation.

45. The method of claim 43, wherein said order to trade said exchange-listed financial instrument comprises at least one of (i) a bid to purchase or (ii) an offer to sell said exchange-listed financial instrument at a price based on said net asset value to be calculated and published at or after a specified time.

46. A computer-based system for trading an exchange-listed financial instrument on or away from an exchange, the system comprising;
a module configured to deliver at least one order to trade an exchange-listed financial instrument for which a net asset value can be calculated priced relative to a net asset value to be calculated and published at or after a specified time;
a module configured to receive information on terms of an executed trade for said financial instrument; and
one or more processors, executing said modules,
wherein a price of said executed trade is determined from a set of prices that are specified relative to said net asset value, said set of prices comprising (a) a first price that is at a specified discount to said net asset value; (b) a second price that is equal to said net asset value; and (c) a third price that is at a specified premium to said net asset value.

47. The system of claim 46, wherein a format of said order to trade said exchange-listed financial instrument comprises at least one of (i) a root trading symbol for said exchange-listed financial instrument with an extension designating said net asset value calculation and (ii) a specified trading symbol designating both said exchange-listed financial instrument and said net asset value calculation.

48. The system of claim 46, wherein said order to trade said exchange-listed financial instrument comprises at least one of (i) a bid to purchase and (ii) an offer to sell said exchange-listed financial instrument at a price based on said net asset value to be calculated and published at or after a specified time.

49. A computer program product comprising a computer useable medium having computer program logic recorded thereon for enabling a processor to trade an exchange-listed financial instrument for which a net asset value can be calculated on or away from an exchange, the computer program logic comprising:
first computer readable program code module to enable a processor to deliver at least one order to trade an exchange-listed financial instrument for which a net asset value can be calculated priced relative to a net asset value to be calculated and published at or after a specified time; and
second computer readable program code module to enable a processor to receive information on terms of an executed trade for said exchange-listed financial instrument,
wherein a price of said executed trade is determined from a set of prices that are specified relative to said net asset value, said set of prices comprising (a) a first price that is at a specified discount to said net asset value; (b) a second price that is equal to said net asset value; and (c) a third price that is at a specified premium to said net asset value.

50. The computer program product of claim 49, wherein a format of said order to trade said exchange-listed financial instrument comprises at least one of (i) a root trading symbol for said exchange-listed financial instrument with an extension designating said net asset value calculation and (ii) a specified trading symbol designating both said exchange-listed financial instrument and said net asset value calculation.

51. The computer program product of claim 49, wherein said order to trade said exchange-listed financial instrument comprises at least one of (i) a bid to purchase and (ii) an offer to sell said exchange-listed financial instrument at a price based on said net asset value to be calculated and published at or after a specified time.

52. A computer-based method for making a market in an exchange-listed financial instrument for which a net asset value can be calculated on or away from an exchange, the method comprising:
receiving an order to buy or sell an exchange-listed financial instrument for which a net asset value can be calculated priced relative to a net asset value to be calculated and published at or after a specified time;
matching said received order with at least one of (i) a complementary sell or buy order from another party to trade said exchange-listed financial instrument at or relative to said net asset value calculation, (ii) a complementary offer or bid posted in an organized market for trading said instrument at or relative to said net asset value calculation and (iii) a complementary offer or bid to trade with a book of a market maker; and
determining an execution price for said matched order, wherein said execution price is from a set of prices that are specified relative to said net asset value, said set of prices comprising (a) a first price that is at a specified discount to said net asset value; (b) a second price that is equal to said net asset value; and (c) a third price that is at a specified premium to said net asset value; and
wherein said receiving, matching and determining steps are executed by one or more processors.

53. A computer-based system for making a market in an exchange-listed financial instrument for which a net asset value can be calculated on or away from an exchange, the system comprising;
a module configured to receive an order to buy or sell an exchange-listed financial instrument for which a net asset value can be calculated priced relative to a net asset value to be calculated and published at or after a specified time;
a module configured to match said received order with at least one of (i) a complementary sell or buy order from another party to trade said exchange-listed financial instrument at or relative to said net asset value calculation, (ii) a complementary offer or bid posted in an organized market for trading said instrument at or relative to said net asset value calculation and (iii) a complementary offer or bid to trade with a book of a market maker;
a module configured to determine an execution price for said matched order, wherein said execution price is from a set of prices that are specified relative to said net asset value, said set of prices comprising (a) a first price that is at a specified discount to said net asset value; (b) a second price that is equal to said net asset value; and (c) a third price that is at a specified premium to said net asset value; and
one or more processors, executing said modules.

54. A computer program product comprising a computer useable medium having computer program logic recorded thereon for enabling a processor to make a market in an exchange-listed financial instrument for which a net asset value can be calculated on or away from an exchange, the computer program logic comprising;

first computer readable program code module to enable a processor to receive an order to buy or sell an exchange-listed financial instrument for which a net asset value can be calculated priced relative to a net asset value to be calculated and published at or after a specified time;

second computer readable program code module to enable a processor to match said received order with at least one of (i) a complementary sell or buy order from another party to trade said exchange-listed financial instrument at or relative to said net asset value calculation, (ii) a complementary offer or bid posted in an organized market for trading said instrument at or relative to said net asset value calculation and (iii) a complementary offer or bid to trade with a book of a market maker; and third computer readable program code module to enable a processor to determine an execution price for said matched order, wherein said execution price is from a set of prices that are specified relative to said net asset value, said set of prices comprising (a) a first price that is at a specified discount to said net asset value; (b) a second price that is equal to said net asset value; and (c) a third price that is at a specified premium to said net asset value.

55. A computer program product comprising a computer useable medium having computer program logic recorded thereon for enabling a processor to manage an investment fund having (i) a portfolio comprised of any combination of financial instruments and cash and (ii) a general class of fund shares tradable in a secondary market, wherein assets enter and are removed from said investment fund through an exchange-traded fund share creation and redemption process governed by a set of rules, the computer program logic comprising:

first computer readable program code module to enable a processor to at least one of specify and deliver information that identifies a combination of financial instruments and cash to be exchanged for a specified number of shares of said general class of fund shares;

second computer readable program code module to enable a processor to receive a notice of commitment to create or redeem shares of said general class of fund shares by a specified time prior to a time prices are determined for calculating a net asset value of said general class of fund shares and calculating a value of said financial instruments and cash exchangeable for a specified number of shares of said general class of fund shares; and third computer readable program code module to enable a processor to at least one of (i) create new shares of said general class of fund shares by receiving any combination of financial instruments and cash exchangeable for said new shares; and (ii) redeem existing shares of said general class of fund shares by delivering any combination of financial instruments and cash exchangeable for said existing shares.

56. The computer program product of claim 55, wherein greater than a specified percentage of said financial instruments held by said investment fund are traded on one or more primary markets outside of the United States, and wherein said financial instruments trade on said primary market after receipt of said notice of commitment to create or redeem shares and before prices are determined for calculation of a net asset value of said fund shares and calculation of a value of said financial instruments.

57. The computer program product of claim 55, further comprising:

fourth computer readable program code module to enable a processor to at least one of (i) purchase one or more financial instruments and (ii) sell one or more financial instruments to modify said portfolio prior to a time prices are determined for calculating a net asset value of said general class of fund shares and calculating a value of said financial instruments and cash exchangeable for a specified number of shares of said general class of fund shares.

58. The computer program product of claim 55, further comprising:

fourth computer readable program code module to enable a processor to reject said received notice of commitment to create shares if said created shares would increase the fund size beyond a maximum fund size stated in terms of at least one of (i) a total number of shares of said general class of fund shares and equivalents and (ii) a total value of fund assets.

59. The computer program product of claim 58, wherein said maximum fund size is based on at least one of: (i) a measure of liquidity of holdings in said fund portfolio; (ii) an imposed limit on expansion of said investment fund set in a prospectus of said fund, and (iii) an imposed limit on expansion set by a fund board.

60. The computer program product of claim 58, wherein a management fee to be paid to an investment manager of said investment fund is changed based on at least one of (i) the absolute or relative performance of said investment fund and (ii) a premium or discount from net asset value at which said fund shares trade in said secondary market.

61. The computer program product of claim 55, further comprising:

fourth computer readable program code module to enable a processor to at least one of calculate and distribute an intra-day fund share net asset value proxy based on said fund portfolio during a trading day at a specified interval greater than a 15-second interval.

62. The computer program product of claim 61, further comprising:

fifth computer readable program code module to enable a processor to at least one of calculate and distribute modified supplementary net asset value proxies at more frequent intervals within said specified interval.

63. The computer program product of claim 62, wherein said modified supplementary net asset value proxies are computed by at least one of (i) adding random values to and (ii) subtracting random values from said intra-day fund share net asset value proxy at times within said specified interval.

64. A computer program product comprising a computer useable medium having computer program logic recorded thereon for enabling a processor to manage an investment fund having (i) a portfolio comprised of any combination of financial instruments and cash and (ii) a general class of fund shares tradable in a secondary market, wherein assets enter and are removed from said investment fund through an exchange-traded fund share creation and redemption process governed by a set of rules, the computer program logic comprising:

first computer readable program code module to enable a processor to at least one of specify and deliver information that identifies a combination of financial instruments and cash to be exchanged for a specified number of shares of said general class of fund shares;

second computer readable program code module to enable a processor to receive a notice of commitment to create or redeem shares of said general class of fund shares by a specified time prior to a time prices are determined for calculating a net asset value of said general class of fund shares and calculating a value of said financial instruments and cash exchangeable for a specified number of shares of said general class of fund shares;

third computer readable program code module to enable a processor to at least one of (i) create new shares of said general class of fund shares by receiving any combination of financial instruments and cash exchangeable for said new shares; and (ii) redeem existing shares of said general class of fund shares by delivering any combination of financial instruments and cash exchangeable for said existing shares; and fourth computer readable program code module to enable a processor to at least one of (i) purchase one or more financial instruments and (ii) sell one or more financial instruments to modify said portfolio prior to a time prices are determined for calculating a net asset value of said general class of fund shares and calculating a value of said financial instruments and cash exchangeable for a specified number of shares of said general class of fund shares.

65. The computer program product of claim 64, wherein greater than a specified percentage of said financial instruments held by said investment fund are traded on one or more primary markets outside of the United States, and wherein said financial instruments trade on said primary market after receipt of said notice of commitment to create or redeem shares and before prices are determined for calculation of a net asset value of said fund shares and calculation of a value of said financial instruments.

66. The computer program product of claim 64, further comprising:

fifth computer readable program code module to enable a processor to at least one of calculate and distribute an intra-day fund share net asset value proxy based on said fund portfolio during a trading day at a specified interval greater than a 15-second interval.

67. A computer program product comprising a computer useable medium having computer program logic recorded thereon for enabling a processor to manage an investment fund having (i) a portfolio comprised of any combination of financial instruments and cash and (ii) a general class of fund shares tradable in a secondary market, wherein assets enter and are removed from said investment fund through an exchange-traded fund share creation and redemption process governed by a set of rules, the computer program logic comprising:

first computer readable program code module to enable a processor to at least one of specify and deliver information that identifies a combination of financial instruments and cash to be exchanged for a specified number of shares of said general class of fund shares;

second computer readable program code module to enable a processor to receive a notice of commitment to create or redeem shares of said general class of fund shares by a specified time prior to a time prices are determined for calculating a net asset value of said general class of fund shares and calculating a value of said financial instruments and cash exchangeable for a specified number of shares of said general class of fund shares;

third computer readable program code module to enable a processor to at least one of (i) create new shares of said general class of fund shares by receiving any combination of financial instruments and cash exchangeable for said new shares; and (ii) redeem existing shares of said general class of fund shares by delivering any combination of financial instruments and cash exchangeable for said existing shares;

fourth computer readable program code module to enable a processor to at least one of (i) purchase one or more financial instruments and (ii) sell one or more financial instruments to modify said portfolio prior to a time prices are determined for calculating a net asset value of said general class of fund shares and calculating a value of said financial instruments and cash exchangeable for a specified number of shares of said general class of fund shares; and fifth computer readable program code module to enable a processor to at least one of calculate, distribute, and receive an intra-day fund share net asset value proxy based on said fund portfolio during a trading day at a specified interval greater than a 15-second interval.

68. The computer program product of claim 67, further comprising:

sixth computer readable program code module to enable a processor to at least one of calculate and distribute modified supplementary net asset value proxies at more frequent intervals within said specified interval.

69. The computer program product of claim 68, wherein said modified supplementary net asset value proxies are computed by at least one of (i) adding random values to and (ii) subtracting random values from said intra-day fund share net asset value proxy at times within said specified interval.

70. The computer program product of claim 67, wherein greater than a specified percentage of said financial instruments held by said investment fund are traded on one or more primary markets outside of the United States, and wherein said financial instruments trade on said primary market after receipt of said notice of commitment to create or redeem shares and before prices are determined for calculation of a net asset value of said fund shares and calculation of a value of said financial instruments.

71. The computer program product of claim 67, further comprising:

sixth computer readable program code module to enable a processor to reject said received notice of commitment to create shares if said created shares would increase the fund size beyond a maximum find size stated in terms of at least one of (i) a total number of shares of said general class of fund shares and equivalents and (ii) a total value of fund assets.

72. The computer program product of claim 71, wherein a management fee to be paid to an investment manager of said investment fund is changed based on at least one of (i) the absolute or relative performance of said investment fund and (ii) a premium or discount from net asset value at which said fund shares trade in said secondary market.

73. A computer program product comprising a computer useable medium having computer program logic recorded thereon for enabling a processor to make markets in shares of an investment fund having (i) a portfolio comprised of any combination of financial instruments and cash and (ii) a general class of fund shares tradable in a secondary market, wherein an authorized participant at least one of creates and redeems shares of said investment fund through an exchange-traded fund share creation and redemption process governed by a set of rules, the computer program logic comprising:

first computer readable program code module to enable a processor to receive information that identifies a combination of financial instruments and cash to be exchanged for a specified number of shares of said general class of fund shares;

second computer readable program code module to enable a processor to deliver a notice of commitment to create or redeem shares of said general class of fund shares by a specified time prior to a time prices are determined for calculating a net asset value of said general class of fund shares and calculating a value of said financial instruments and cash exchangeable for a specified number of shares of said general class of fund shares; and third computer readable program code module to enable a processor to at least one of (i) deliver any combination of financial instruments and cash in exchange for new shares of said general class of fund shares and (ii) receive any combination of financial instruments and cash in exchange for existing shares of said general class of fund shares.

74. The computer program product of claim 73, further comprising:

fourth computer readable program code module to enable a processor to receive an intra-day fund share net asset value proxy based on said fund portfolio during a trading day at a specified interval greater than a 15-second interval.

75. The computer program product of claim 74, further comprising:

fifth computer readable program code module to enable a processor to receive modified supplementary net asset value proxies at more frequent intervals within said specified interval.

76. The computer program product of claim 75, wherein said modified supplementary net asset value proxies are computed by at least one of (i) adding random values to and (ii) subtracting random values from said intra-day fund share net asset value proxy at times within said specified interval.

77. The computer program product of claim 73, wherein said rules permit a rejection of said delivered notice of commitment to create shares if said created shares would increase the fund size beyond a maximum fund size stated in terms of at least one of (i) a total number of shares of said general class of fund shares and equivalents and (ii) a total value of fund assets, and wherein an authorized participant that redeems fund shares after said investment fund has reached said maximum fund size is permitted to re-create shares.

78. A computer program product comprising a computer useable medium having computer program logic recorded thereon for enabling a processor to trade shares of an investment fund having (i) a portfolio comprised of any combination of financial instruments and cash and (ii) a general class of fund shares tradable in a secondary market, wherein assets enter and are removed from said investment fund through an exchange-traded fund share creation and redemption process, the computer program logic comprising:

first computer readable program code module to enable a processor to trade one or more shares of said general class of fund shares of said investment fund on a secondary market;

second computer readable program code module to enable a processor to execute a trade for said one or more shares priced relative to a net asset value or net asset value proxy to be calculated and published at or after a specified time;

third computer readable program code module to enable a processor to determine a price for said executed trade, wherein said determined price is from a set of prices that are relative to said net asset value or said net asset value proxy, said set of prices comprising (a) a first price that is at a specified discount to said net asset value or said net asset value proxy; (b) a second price that is equal to said net asset value or said net asset value proxy; and (c) a third price that is at a specified premium to said net asset value or said net asset value proxy; and fourth computer readable program code module to enable a processor to submit said executed trade for settlement at said determined price.

79. A computer program product comprising a computer useable medium having computer program logic recorded thereon for enabling a processor to manage an investment fund having a portfolio comprised of any combination of financial instruments and cash and a general class of fund shares tradable in a secondary market, wherein assets enter and are removed from said investment fund through an exchange-traded fund share creation and redemption process governed by a set of rules, the computer program logic comprising:

first computer readable program code module to enable a processor to at least one of specify and deliver information consisting of a designated combination of financial instruments and cash to be exchanged for a specified number of shares of said general class of fund shares;

second computer readable program code module to enable a processor to receive a notice of commitment to create or redeem shares of said general class of fund shares by a specified time prior to a time prices are determined for calculating a net asset value of said general class of fund shares and calculating a value of said financial instruments and cash exchangeable for a specified number of shares of said general class of fund shares; and third computer readable program code module to enable a processor to at least one of (i) create new shares of said general class of fund shares by receiving any combination of financial instruments and cash exchangeable for said new shares; and (ii) redeem existing shares of said general class of fund shares by delivering any combination of financial instruments and cash exchangeable for said existing shares, wherein said fund portfolio is divided into (i) one of a first segment represented by said designated financial instruments and a first segment represented by said designated financial instruments and cash and (ii) an undisclosed second segment representing any combination of long and short or short equivalent positions and cash in said fund portfolio, and wherein a long investment in appropriately sized positions in said first and second segments replicates a net asset value performance of a specified number of said general class of fund shares.

* * * * *